(12) United States Patent
Alexandrino et al.

(10) Patent No.: US 12,065,247 B2
(45) Date of Patent: Aug. 20, 2024

(54) SEAT UNIT AND PASSENGER SEATING ARRANGEMENT PROVIDED WITHIN A VEHICLE CABIN

(71) Applicant: ADIENT AEROSPACE LLC, Bothell, WA (US)

(72) Inventors: Edson Manuel Ribeiro Alexandrino, London (GB); Anthony Harcup, Virginia Water (GB); Nicholas Lendon, Woking (GB); Andrew Stephen Fereday Williams, London (GB)

(73) Assignee: Adient Aerospace LLC, Bothell, WA (US)

( * ) Notice: Subject to any disclaimer, the term of this patent is extended or adjusted under 35 U.S.C. 154(b) by 939 days.

(21) Appl. No.: 17/030,295

(22) Filed: Sep. 23, 2020

(65) Prior Publication Data

US 2021/0001988 A1 Jan. 7, 2021

Related U.S. Application Data

(63) Continuation of application No. PCT/EP2018/057554, filed on Mar. 23, 2018.

(51) Int. Cl.
*B64D 11/06* (2006.01)
*B64D 11/00* (2006.01)
(52) U.S. Cl.
CPC ...... *B64D 11/0601* (2014.12); *B64D 11/0015* (2013.01); *B64D 11/064* (2014.12); *B64D 11/0641* (2014.12); *B64D 11/0605* (2014.12); *B64D 11/0606* (2014.12)

(58) Field of Classification Search
CPC . B64D 11/06; B64D 11/0601; B64D 11/0602; B64D 11/0627; B64D 11/064; B64D 11/0641; B64D 11/0606
See application file for complete search history.

(56) References Cited

U.S. PATENT DOCUMENTS

| 7,918,504 | B2 | 4/2011 | Thompson | |
|---|---|---|---|---|
| 8,201,885 | B2 | 6/2012 | Thompson | |
| 9,550,573 | B2 | 1/2017 | Ersan et al. | |
| 10,647,221 | B2 * | 5/2020 | Trillaud | B64D 11/0604 |
| 10,926,877 | B1 * | 2/2021 | Puglisi | B64D 11/0627 |

(Continued)

FOREIGN PATENT DOCUMENTS

| GB | 2476385 A | 6/2011 |
|---|---|---|
| GB | 2500258 A | 9/2013 |

(Continued)

OTHER PUBLICATIONS

"International Search Report & Written Opinion Issued in PCT Application No. PCT/EP2018/057554", Mailed Date: Nov. 21, 2018, 9 Pages.

*Primary Examiner* — Benjamin P Lee
(74) *Attorney, Agent, or Firm* — Jordan IP Law, LLC

(57) ABSTRACT

A seat unit for a passenger seating arrangement provided within a vehicle cabin, wherein—the seat unit comprising at least a forward facing seat and at least a console arranged adjacent to the seat and a wall structure, wherein the seat unit is configured to link—the forward facing seat arranged in front of the wall structure, and—an angled seat arranged behind the wall structure, wherein the console provides a footwell for a passenger of the angled seat.

19 Claims, 18 Drawing Sheets

(56) References Cited

U.S. PATENT DOCUMENTS

| | | | |
|---|---|---|---|
| 11,498,682 B2* | 11/2022 | White | B64D 11/00153 |
| 2010/0038484 A1* | 2/2010 | Ersan | B64D 11/06 |
| | | | 244/118.6 |
| 2012/0228902 A1 | 9/2012 | Thompson | |
| 2013/0068887 A1 | 3/2013 | Ko | |
| 2014/0300152 A1* | 10/2014 | Park | B64D 11/0641 |
| | | | 297/232 |
| 2015/0360783 A1* | 12/2015 | Cailleteau | B64D 11/06 |
| | | | 244/118.6 |
| 2016/0272323 A1* | 9/2016 | Carlioz | B64D 11/0602 |
| 2017/0129611 A1* | 5/2017 | Morgan | B64D 11/0643 |
| 2017/0259921 A1* | 9/2017 | Valdes De La Garza | B64D 11/0638 |
| 2017/0327232 A1* | 11/2017 | Morgan | B64D 11/0606 |
| 2019/0233116 A1* | 8/2019 | Braca | B64D 11/0639 |
| 2019/0259171 A1* | 8/2019 | Ueno | B64D 11/0015 |
| 2021/0001987 A1* | 1/2021 | Harcup | B64D 11/0605 |
| 2021/0001988 A1* | 1/2021 | Alexandrino | B64D 11/0015 |
| 2021/0009271 A1* | 1/2021 | Katakura | B64D 11/0605 |
| 2021/0179273 A1* | 6/2021 | Senechal | B64D 11/0023 |
| 2021/0188441 A1* | 6/2021 | Lee | B64D 11/0604 |
| 2021/0197973 A1* | 7/2021 | Katakura | B64D 11/0612 |
| 2021/0403167 A1* | 12/2021 | Carlioz | B64D 11/06 |
| 2022/0212803 A1* | 7/2022 | James | B64D 11/0601 |
| 2022/0281605 A1* | 9/2022 | Woodington | B64D 11/064 |
| 2022/0332420 A1* | 10/2022 | Miedema | B64D 11/0601 |
| 2022/0332425 A1* | 10/2022 | Jérôme | B64D 11/0604 |
| 2022/0388664 A1* | 12/2022 | Nicolato | B64D 13/06 |
| 2023/0182903 A1* | 6/2023 | Manson | B64D 11/0601 |
| | | | 244/118.6 |

FOREIGN PATENT DOCUMENTS

| | | |
|---|---|---|
| WO | 2005014395 A1 | 2/2005 |
| WO | WO 2005/014395 A1 | 2/2005 |

* cited by examiner

SEAT UNIT AND PASSENGER SEATING ARRANGEMENT PROVIDED WITHIN A VEHICLE CABIN

This nonprovisional application is a continuation of International Application No. PCT/EP2018/057554, which was filed on Mar. 23, 2018, and which is herein incorporated by reference.

BACKGROUND OF THE INVENTION

Field of the Invention

The present invention relates to a seat unit for a passenger seating arrangement provided within a vehicle cabin, in particular an aircraft cabin. Further, the invention relates to such a passenger seating arrangement.

Description of the Background Art

Specific seating arrangements tend to be sold as specific set layouts, and are just cosmetically for different airlines. When a new cabin layout is introduced, this is typically either as revision of the previous layout or a brand new layout that has been started from scratch. For airlines, this tends to limit their choice from any one seat manufacturer. For seat manufacturers, there can be significant cost in needing to constantly develop brand new layouts.

SUMMARY OF THE INVENTION

It is therefore an object of the present invention to provide an improved, easy changeable seat unit for a passenger seating arrangement provided within a vehicle cabin. It is a further object of the present invention to provide a vehicle cabin comprising such a passenger seating arrangement.

Provided is a seat unit for a passenger seating arrangement provided wherein the seat unit comprising at least a forward facing seat and at least a console arranged adjacent to the seat and a wall structure; wherein the seat unit is configured to link the forward facing seat arranged in front of the wall structure, and an angled seat arranged behind the wall structure wherein the console provides a footwell for a passenger of the angled seat. In particular, the console comprises an opened space providing the footwell on a rear side which is accessible by the passenger seated behind.

Exemplarily, the angled seat can be positioned behind the forward facing seat, whereas the console of the forward facing seat provides the footwell to the passenger seated on the angled seat, due to identification of specific geometries that allow the footwell of the angled seat to tessellate with the forward facing seat. Thereby, a passenger seating arrangement is not limited to identical seat units which are forced to be arranged one behind another. According to the present invention, different seat units can tessellate with each other, e. g. within the same column. Moreover, giving each of the different seat units a commonality of structural parts, dimensions and styling enables dissimilar seat unit types and/or seat types to be arranged together within the same passenger seating arrangement.

Furthermore, unique connective geometry of the seat units allows, exemplarily so called herringbone seats and inline seats to join end to end in a single column in an advantageously manner. For example, flexibility for designing seating arrangements, particularly cabin layouts, can be ensured whilst allowing a cabin space optimisation.

In an embodiment, the seat unit can be configured to link the forward facing seat arranged in front of the wall structure, and either an angled seat or a forward facing seat arranged behind the wall structure wherein the console provides a footwell for the passenger of either the angled seat or the forward facing seat. In particular, the forward facing seat is one of a termed inline seat. The console of the inline seat unit is arranged adjacent of the inline seat, whereas a longitudinal axis of the console as well as a longitudinal axis of the inline seat is each parallel to a longitudinal axis of the cabin. In particular, a seat-facing side of the console is adjacent, particularly aligned to a console-facing side of the seat. Thereby, according to an embodiment of the present invention, the console of the seat unit (comprising the forward facing seat) can provide the footwell for either a further forward facing seat or an angled seat arranged in the back. That means that the footwell within the console is shaped in such a manner that the footwell can either align with another forward facing seat or the angled seat.

In particular, the console comprises a transition module, e.g. comprising a housing structure adapted to receive at least one of a monitor, a table structure and storage area for the passenger seated behind, particularly of the angled seat unit. Further, the transition module is adapted to allow a transition between the inline seat unit, particularly a forward facing seat unit, and an angled seat unit.

In particular, the transition module allows transition between an inline seat unit with a forward facing seat and an angled or herringbone seat unit with an angled seat.

For example, the transition module is one of a furniture part which is detachable mounted to a console structure. Optionally, the transition module and the console are configured as a one-piece furniture part of the corresponding, particularly forward facing/inline seat unit. For instance, the console and the wall structure are assembled to a common transition module.

In particular, the wall structure comprises a transition module, e.g. comprising a housing structure adapted to receive at least one of a monitor, a table structure and storage for the passenger seated behind, particularly of the angled seat unit. For instance, the transition module has a capability to install the monitor such that the monitor is arranged perpendicular to the angled seat. Moreover, the transition module is adapted to allow a transition between a front forward facing seat unit and a rear angled seat unit. For example, the transition module is one of a furniture part which is detachable mounted to the wall structure. Optionally, the transition module and the wall structure are configured as a one-piece furniture part of the corresponding, particularly forward facing/inline seat unit.

In an embodiment, the transition module comprises at least two housings to receive the monitor and the table structure. Particularly, the table structure can be arranged, particularly stowed and deployed, underneath the monitor.

According to an embodiment, several angled seat units can be identically angled and arranged behind each other. Thereby, the at least one transition module of the forward facing seat unit is configured to adapt an angle, particularly the same angle as the several angled seat units arranged identically behind each other. This improves an optical appearance of the passenger seating arrangement.

In an exemplary embodiment, the wall structure is configured to accommodate a monitor for the passenger of the angled seat wherein the monitor is arranged perpendicular to a longitudinal axis of the angled seat.

In particular, the monitor is movable with respect to the wall structure. For instance, the monitor is pivotable to arrange it perpendicular to the longitudinal axis of the angled seat. Optionally, the monitor is immovable fixed within a housing structure of the transition module.

Furthermore, the forward facing seat is distanced from the wall structure at least between 15 cm and 25 cm, in particular about 18 cm.

According to an embodiment, a longitudinal axis of the angled seat is relatively angled with respect to a longitudinal axis of the cabin between 25° and 45, in particular about 28 to 35.

In an exemplary embodiment, the angled seat in a bed position is aligned to an outer surface, particularly to a back shell of the wall structure. In particular, a side surface of the angled seat in bed position is partially adjacent to the back shell of the wall structure, following a shape of the wall structure. In particular, the forward facing seat and the angled seat do not overlap due to the distance of the forward facing seat from the wall structure and a specific angle of the angled seat.

According to an embodiment, the wall structure, in particular a rear wall and/or the back shell are/is substantially asymmetrically shaped. For instance, the rear wall can comprise one of an S-shape, whereas the S-shape is asymmetrical, having asymmetrical portions. Thereby, any collisions between the forward facing seat and the angled seat in the bed position can be avoided. In particular, mechanics, such as kinematics and seat frame structures, of the forward facing seat can be arranged between the forward facing seat and the wall structure, whereas the angled seat does not overlap with this portion in its bed position.

The disclosure further provides a passenger seating arrangement provided within a vehicle cabin comprising a plurality of seat units, wherein the seat units in one column are arranged one behind another in a longitudinal direction of the cabin and each seat unit provides a seat being adjustable between at least a seating position and at least a bed position. Further, each seat unit is adapted to partially surrounding one of the seats and providing a passenger access to said one seat, wherein the seat units are configured to have essentially common outer dimensions, particularly mating geometry, and wherein each seat unit is adapted to be assembled in at least two different orientations, exemplary comprising angled and/or forward facing seat orientations, particularly with respect to a cabin axis. Additionally or optionally, each seat unit is adapted to be assembled in at least two different locations of a corresponding seat with respect to the cabin, in particular to the cabin axis, within the vehicle cabin.

In particular, each seat unit is adapted to be assembled having common outer dimensions, whereas angled seats as well as forward facing seats are positionable within each seat unit. That means that each seat unit can be simply transferred from a forward facing seat unit to an angled seat unit and vice versa.

In particular, each seat unit is adapted to be assembled having common outer dimensions, whereas the location of the corresponding seat of each seat unit is positionable with respect to a cabin wall and to an aisle within the vehicle cabin. For example, the corresponding seat of each seat unit can be positioned on an inner or an outer location with respect to the cabin wall and the aisle.

Further, each seat unit is adapted to be assembled having common outer dimensions, whereas each seat unit is positionable in an outer column arranged along each cabin wall. Additionally, each seat unit is positionable in an inner center column arranged between the outer columns. For example, the inner center column is distanced from each of the outer columns by one aisle.

According to the present invention of the passenger seating arrangement, a high customization of the passenger seating arrangement within the vehicle cabin is ensured. The passenger seating arrangement does not have to be sold as a specific layout of seat units. The layout as well as each seat unit can be changed individually within the same vehicle cabin. In particular, by providing essentially common outer dimensions for each seat unit, a change of the passenger seating arrangement can be simplified. Therefore, manufacturing costs and manufacture as well as a revision time can be reduced. Moreover, a customer choice of specific cabin layouts is not limited.

Especially, each seat unit can tessellate with one of an identical or different seat unit within one column, particularly in rows behind and ahead of each seat unit. Thereby, some components, such as herringbone footwells, have geometry to allow them to tessellate with different and/or identical adjacent seat units. In particular, a use of space within the vehicle cabin can be advantageously optimised whilst ensuring a high comfort space to each passenger.

Furthermore, when the passenger seating arrangement is once designed and planned for the vehicle cabin, those measurements of cabin dimensions and seat unit dimensions can be used repeatedly. Thereby, variable cabin layouts and/or dissimilar seat configurations with similar linear geometry of aisles/cabin walls in the same vehicle cabin can be ensured. Therefore, furniture parts of the seat units are optionally assembled with respect to each other such that at least module dimensions of each seat unit remain substantially the same in each different layout. In other words: An identification of specific and novel mating-geometry is substantially simplified allowing linear connection of dissimilar seat configurations.

For example, at least a wall structure of the forward facing seat unit and the wall structure of the angled seat unit are substantially identical. When a customer desires to change the seat of the forward facing seat unit to an angled seat, at least the wall structure can be reused and vice versa. Particularly, same congruent ground plan or identical outer dimension as the other seat units can be provided even when transferring from one of the forward facing seat unit to one of the angled seat units and vice versa.

It is understood, that appearance and surface design of each of the seat units are individually developable. For example, colors and materials of each seat unit can be customized.

In a further embodiment of the passenger seating arrangement, a number of primary and different seat units is provided wherein the primary seat units are differed from each other by the orientation of the seat with respect to the seat unit. Thereby, the seat units are one of a forward or rearward facing seat unit, wherein at least a longitudinal axis of the seat is parallel to a longitudinal axis of the aircraft cabin, and an angled seat unit, wherein at least the longitudinal axis of the seat is angled relative to the longitudinal axis of the aircraft cabin.

According to a further embodiment, the different primary seat units have a congruent ground plan and/or identical outer dimensions. These primary seat units, e.g. seat shell structures, are similar in all dimensions, e.g. in all X, Y and Z dimensions of the vehicle cabin. These seat units share similar styling identity and character. Further, these seat units house common components, in particular common assemblies such as suite privacy doors, seat controls for the seat and bed positions, reading lights, suite lamps, upper furniture and top shell cappings. In other words: privacy doors, kinematics of the seats and/or doors, infotainment units and/or tables are repeatable common functional parts or elements.

In an exemplary embodiment of the passenger seating arrangement, one of the primary seat units are adapted to form an in-line overall seating layout with an inner in-line arrangement of the seat or an outer in-line arrangement of the seat within the corresponding primary seat unit with respect to a cabin wall and/or an aisle.

In another embodiment of the passenger seating arrangement, one of the primary seat units are adapted to form an angled herringbone seating layout with an outwardly faced/angled arrangement of the seat or an inwardly faced/angled arrangement of the seat within the corresponding primary seat unit with respect to a cabin axis, cabin wall and/or the aisle. Further, the layout can comprise of one an outwardly faced overall herringbone seating layout or an inwardly faced overall herringbone seating layout Exemplarily, to ensure common outer dimensions, in particular base area dimensions, of each of the seat units, common furniture parts are needed. Therefore, each of the seat units are created by components of at least one of a seat shell structure having a number of furniture parts, an armrest structure, a privacy divider, a table structure, and a door structure. The furniture parts comprise at least one of a separation wall at least comprising a side wall bordering an aisle of the cabin and a rear wall separating the seat units in the same column, a console adjacent to the seat providing at least a utility surface for the passenger and a stowage compartment adjacent to the seat. Moreover, the seat units of each layout provide common utility surface dimensions.

According to another embodiment, the console provides at least a footwell for a passenger seated behind. Thereby, at least a shape of the footwell within the console for the forward or rearward facing seat unit differs from a shape of the footwell for the angled seat unit.

In an exemplary embodiment, each of the seat units is formable by different combinations of one of the seat assemblies, one of the seat shell structures, one of the armrest structures, one of the privacy dividers, and one of the table structures, wherein the different seat units have a congruent ground plan or identical outer dimensions.

According to a further exemplary passenger seating arrangement, the seat shell structure comprises a number of common furniture parts to be optionally assembled with respect to each other depending on an orientation of the seat within a desired kind of one of the primary seat units. Moreover, the number of furniture parts is at least partially surrounding the seat and providing a passenger access. Exemplarily, a number of different overall seating layouts within the vehicle cabin are each configurable by optionally assembling a number of common furniture parts with respect to each other depending on an orientation of the seat within desired kind of seat units.

According to an embodiment of the passenger seating arrangement, the seat units are arranged within the cabin to provide at least one of different overall seating layouts, in particular one of an in-line overall seating layout, an outwardly faced overall herringbone seating layout, an inwardly faced overall herringbone seating layout and a combination of different seating layouts for arranging the seat units in the cabin.

The seat units are one of a forward or rearward facing seat unit, wherein at least a longitudinal axis of the seat is parallel to a longitudinal axis of the aircraft cabin, and an angled seat unit, wherein at least the longitudinal axis of the seat is angled relative to the longitudinal axis of the aircraft cabin.

According to another embodiment of the passenger seating arrangement, the furniture parts comprise a number of common basic equipment parts for each of the seat units. Therefore, the furniture parts can be used within each of the different overall seating layouts. Additionally, the furniture parts are optionally assembled with a number of add-on furniture parts providing different shapes for different kinds of seat units. Thereby, the add-on furniture parts comprise a number of add-on armrest parts each providing different dimensions to fit into each of the desired seat units. Further, the add-on furniture parts comprise at least a side surface positionable at least partially along a side of the seat to fit into each of the desired seat units.

In an exemplary embodiment, a width of at least the rear wall in a transverse direction of the cabin and a height of at least the rear wall for each seat unit are identical. Thereby, the rear wall of each seat unit within each of the different overall seating layouts can remain substantially the same.

The present invention further relates to an assembly set configured to form each of the seat units, wherein at least a shape of the console for the forward or rearward facing seat unit differs from a shape of the console for the angled seat unit.

Moreover, the present invention relates to a vehicle cabin, in particular an aircraft cabin, comprising a passenger seating arrangement, exemplarily formed out of an assembly set.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION

Figure 1:
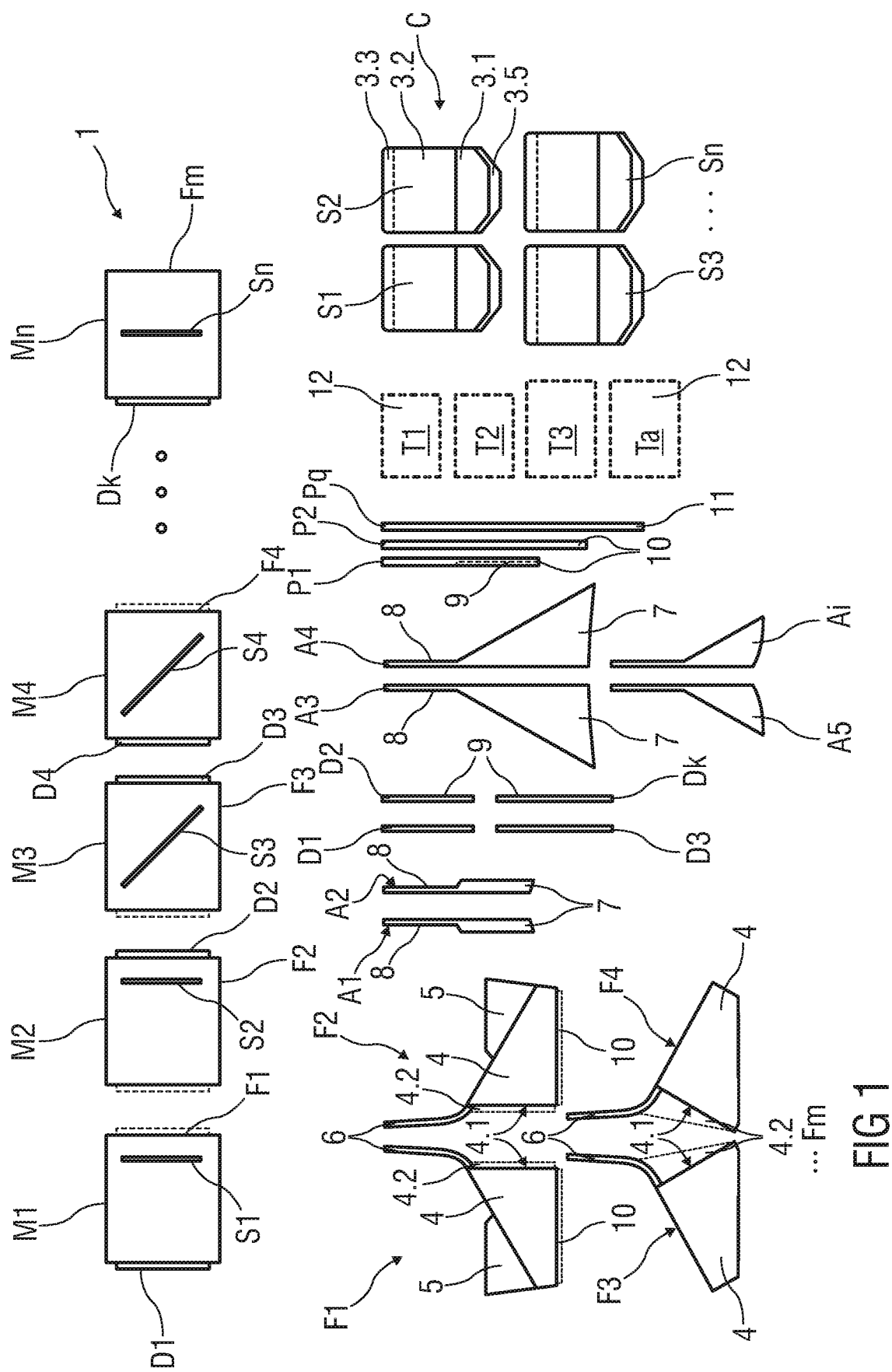
FIG. 1 shows a schematic overview of an assembly set of common components for creating different seat units and variable passenger seating arrangements.

FIG. 1 shows a schematic overview of an assembly set 1 of common components C for creating different seat units M1 to Mn (shown in FIG. 1 schematic, in FIGS. 2A to 3E in detail) and variable passenger seating arrangements 2 in a cabin 100 (shown in FIGS. 4 to 13).

Figure 8:
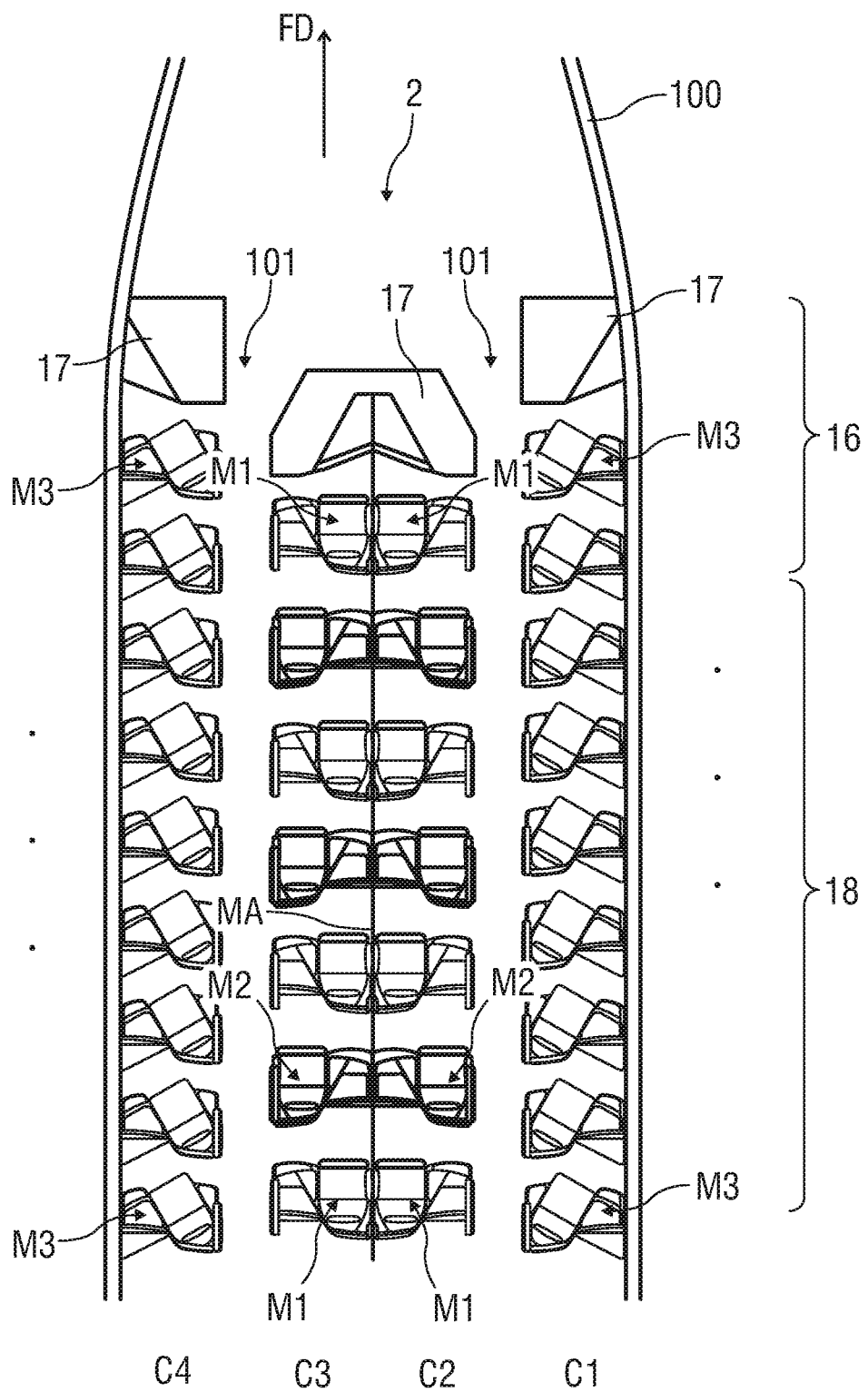
FIGS. 8 to 13 show in each case a top view of an embodiment of a passenger seating arrangement in a vehicle cabin.

For a better understanding of subsequent descriptions of the passenger seating arrangement 2 a coordinate system is shown in further figures. The coordinate system comprises a longitudinal axis x, LA, a transverse axis y and a vertical axis z in relation to the aircraft. In particular, the longitudinal axis x defines a longitudinal direction and length of the vehicle cabin 100, the transverse axis y defines a transverse direction and width of the vehicle cabin 100 and the vertical axis z defines a vertical direction and height of the vehicle cabin 100. Exemplarily, a flight direction FD is shown in FIG. 8.

The assembly set 1 may comprise at least a plurality of seating modules or seat units M1 to Mn.

Each of the seat units M1 to Mn are created by a set of components C, e.g. furniture and/or seat components, of at least one of a plurality of seat assemblies S1 to Sn, a plurality of seat shell structures F1 to Fm, a plurality of armrest structures A1 to Ai, a plurality of door structures D1 to Dk, a plurality of privacy dividers P1 to Pq and a plurality of table structures T1 to Ta.

The different seat units M1 to Mn are formable by different combinations of common components C. In particular, each of the different seat units M1 to Mn is created by one of the seat assemblies S1 to Sn, one of the seat shell structures F1 to Fm, one of the armrest structures A1 to Ai, one of the door structures D1 to Dk, one of the privacy dividers P1 to Pq, and one of the table structures T1 to Ta.

Each of the seat units M1 to Mn comprises a furniture structure having at least one of the seat shell structures F1 to Fm, one of the armrest structures A1 to Ai, one of the door structures D1 to Dk, one of the privacy dividers P1 to Pq or partition wall, and one of the table structures T1 to Ta. In particular, each of the seat units M1 to Mn formed by the furniture structure, e.g. by the seat shell structures F1 to Fm, the privacy dividers P1 to Pq and/or the door structures D1 to Dk can provide an enclosed suite (shown in FIGS. 3A to 3E).

In particular, each of the furniture or seat shell structure F1 to Fm has at least a partition wall, a wall structure 6, to separate the seat units M1 to Mn from each other. The partition wall structure 6 is a wall arranged behind each seat 3 of the seat units M1 to Mn and separates them from each other in the longitudinal direction of the cabin 100.

Figure 4:
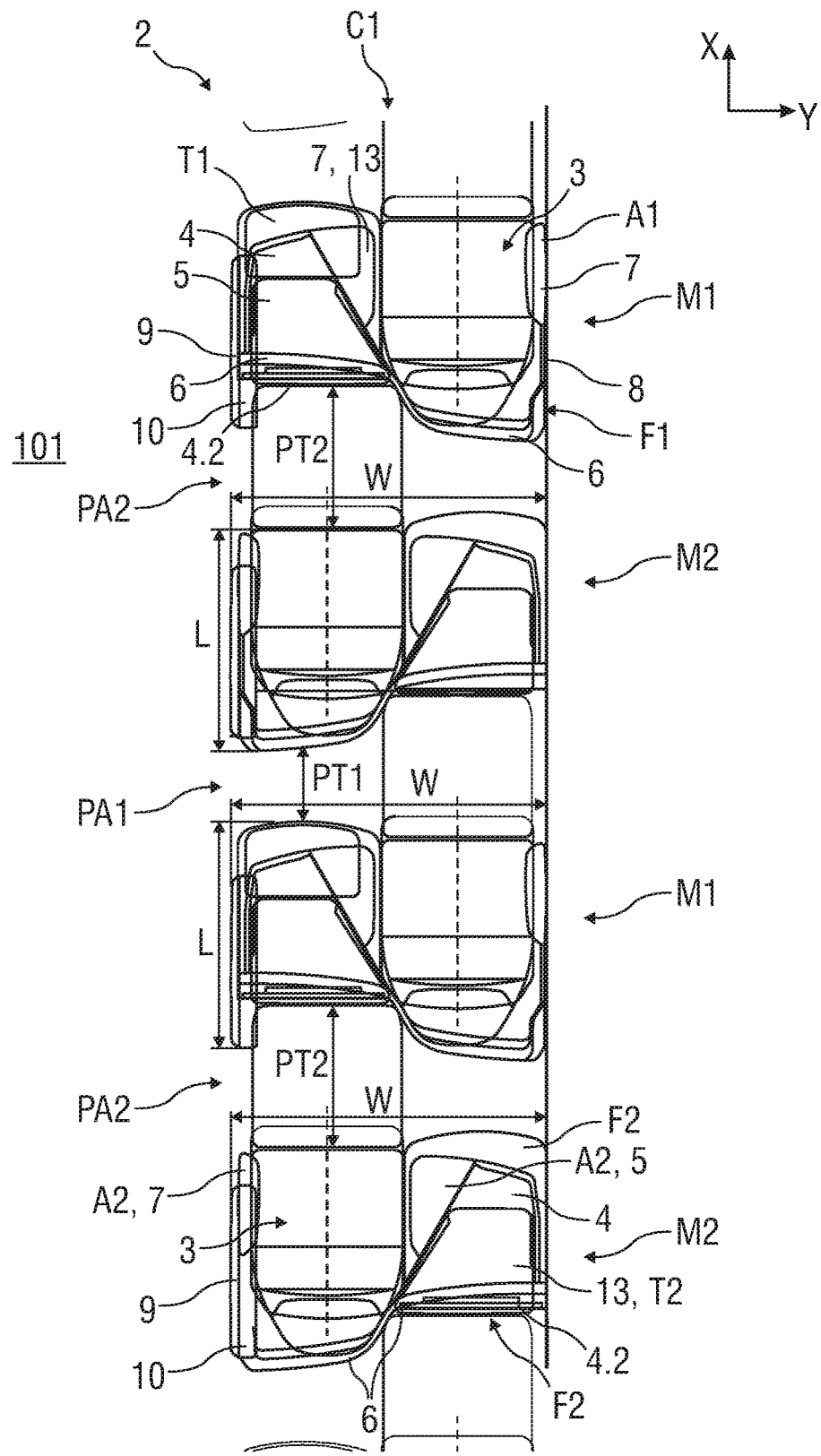
FIGS. 4 to 7 show in each case a top view of an embodiment of a passenger seating arrangement in a column.

The side of the seat unit M1 to Mn which is bordering an aisle 101, exemplarily shown in FIG. 4, can be part of the seat shell structure F1 to Fm. In particular, the seat shell structure F1 to Fm may comprise a pre-assembled privacy wall 10. For instance, the aisle 101 side having such a privacy wall 10 provides privacy to a passenger seated in a corresponding seat unit M1 to Mn from other seat units M1 to Mn positioned opposite the aisle 10.

Each seat assembly S1 to Sn comprises at least a seat 3 being adjustable between at least a seating position and at least a bed position. Each seat 3 comprises at least a backrest 3.1 and a seat pan 3.2. Additionally, the seat 3 may comprise optionally a leg-rest 3.3 and/or a headrest 3.5. For instance, the seat 3 can be brought into one or more positions, e.g. into a taxi, take-off, landing position, designated as "TTL" or "TT&L"-position, an inclined position or a sleeping or bed position. Particularly, in the sleeping position the seat pan 3.2, the backrest 3.1 and optionally the leg-rest 3.3 and/or headrest 3.5 are brought into a substantially flat, horizontal position.

Each seat shell structure F1 to Fm is part of the furniture structure. In a possible embodiment, each seat shell structure F1 to Fm of each seat unit M1 to Mn comprises at least a console forming a footwell 4 for a passenger seated behind and/or a utility surface 5 for a corresponding passenger of the seat unit M1 to Mn. Optionally, the seat shell structure F1 to Fm comprises wall structure 6, e.g. a separating wall.

In particular, the console, e.g. the footwell 4 comprises an open space 4.1. In particular, the open space 4.1 is arranged at a rear side of the footwell 4 facing towards the passenger seated behind, such that the footwell 4 is accessible for a rear passenger. Optionally, the footwell 4 may comprise a panel 4.2 (dotted line) arranged above the footwell 4 to separate the respective seat unit M1 to Mn from another one of the seat units M1 to Mn.

Figure 5:
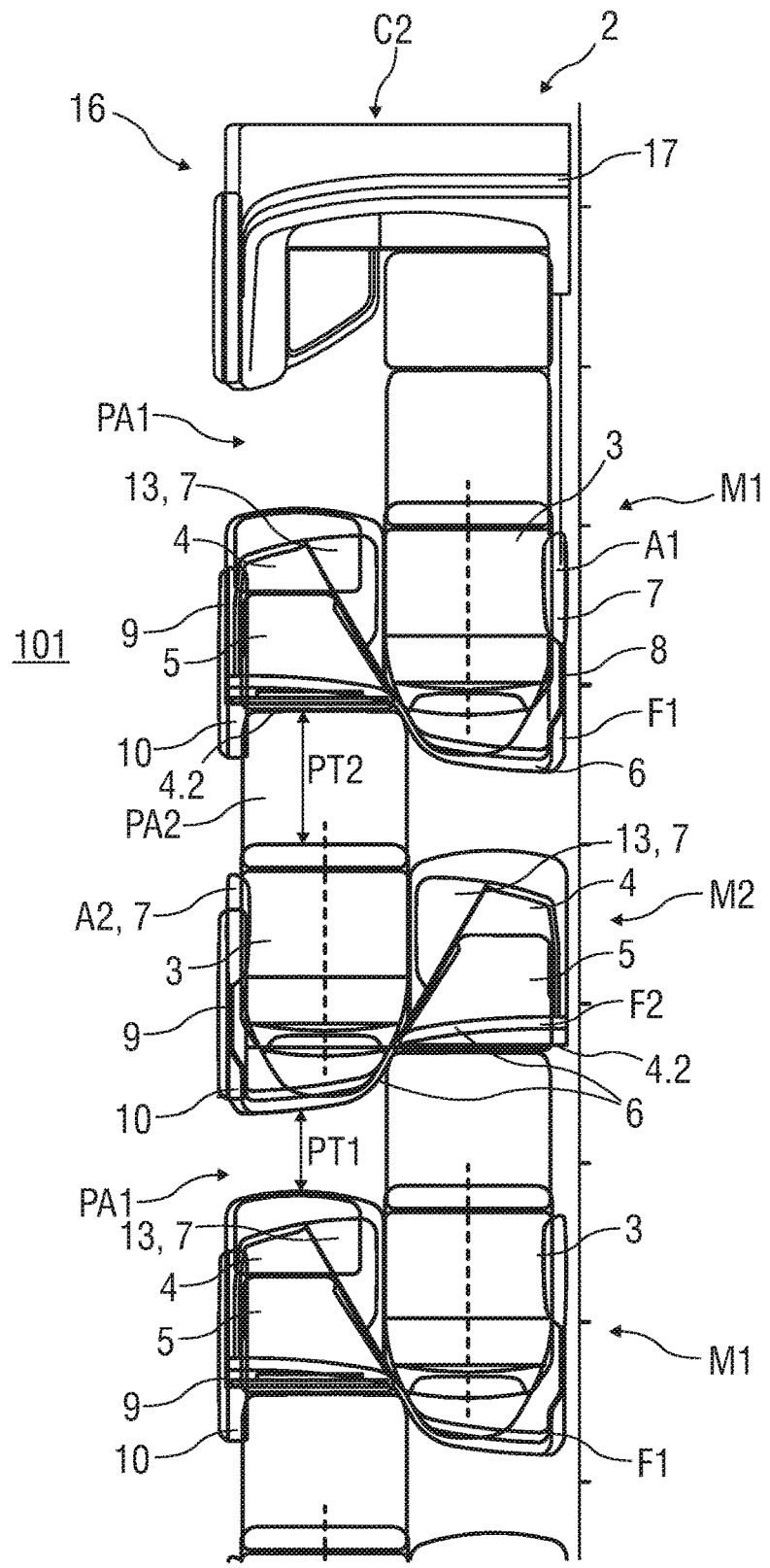

Furthermore, the adjustable seat 3 can be brought into the sleeping position, in particular a bed position, such that the seat 3 is partially projecting into the footwell 4 (shown for instance in FIG. 5). Therefore, the console of the footwell 4 and a corresponding footwell space can be seen as an extension space for the rear passenger.

Further, the seat shell structure F1 to Fm can comprise an inner support surface portion which is fixed to the footwell 4 inside the footwell space. When the seat 3 is brought into the sleeping position, the leg-rest 3.3 comes into contact with the support surface portion of the footwell 4 such that a sleeping surface is extended for the rear passenger. The support surface portion has a corresponding shape with a shape of the leg-rest 3.3.

The utility surface 5 for the corresponding passenger of the seat unit M1 to Mn is provided as an upper support surface portion on the footwell 4 or the console and/or adjacent to the footwell 4. For example, the utility surface 5 can comprise a shelf, a table, storage space and storage area. The storage area can provide storage space for a remote control, magazines, suitcases, shoes, headphones or other items belonging to the passenger or airline. Additionally, the utility surface 5 can comprise service and operational elements, such as switches and HMI-panel to control operable features of the seat unit M1 to Mn.

The armrest structure A1 to Ai for the corresponding passenger of the seat unit M1 to Mn is provided as a furniture structure, in particular a support surface portion arranged next to the corresponding seat 3. Thereby, the armrest structure A1 to Ai comprises at least an armrest 7. Optionally, the armrest structure A1 to Ai comprises support structure 8, e.g. a partition or separating wall.

The armrest 7 can be movable such that at least an extended sleeping surface is created when the armrest 7 is in a stowed position. In particular, the armrest 7 is arranged at a same height as the seat 3 in the bed position. For instance, the armrest 7 is one of a dropping armrest. Additionally, the armrest 7 can provide a storage space for the passenger.

In another exemplary embodiment, the armrest 7 can be configured as a furniture structure with a fixed height H, in particular a height H higher as the height H of the seat 3 in the bed position or of the seat pan 3.2 in the TTL position or seating/comfort position.

In a further embodiment, the armrest 7 may flip up from the support structure 8.

The door structure D1 to Dk comprises at least a privacy door 9 and/or a privacy wall 10. The privacy door 9 may be configured as a separate door which is movable along a bordering side of the seat unit M1 to Mn. The privacy door 9 may be configured as a single or double door with a door part on each side. A double door design allows a private mini suite design.

The privacy wall 10 may be arranged on e.g. an aisle 10 bordering side of the seat unit M1 to Mn. The privacy wall 10 can comprise the movable privacy door 9 for at least partially closing a pitch and a passenger access PA1 to PA4.

The privacy divider P1 to Pq can comprise a movable or fixed privacy screen 11, shown as dotted line. The privacy screen 11 may be arranged on an opposite side of the door structure D1 to Dk of a seat unit M1 to Mn. The privacy screen 11 may be configured as a 2- or 3-pieces dropping screen. The multi-pieces/parts privacy screen 11 may be telescopically stowable such that different heights and/or functions are available. In particular, in a lowest position of the privacy screen 11, the area adjacent to the privacy screen 11 can be used as a lateral foot support or foot space. In a middle position of the privacy screen 11, an upper support portion of the privacy screen 11 can be used as a lateral armrest or support surface for the passenger. Additionally or optionally, the privacy screen 11 can comprise one of a flip-armrest, a fold down or fold up armrest which is stowable within a vertical plane in the privacy screen 11. In a deployed position, the armrest can provide a horizontal arm support to the corresponding passenger. For example, the armrest is pivotably mounted to the privacy screen 11 by means of hinge connections. In an upper position of the privacy screen 11, the privacy screen 11 is used e.g. as a divider between two seat units M1 to Mn or as a separator to an aisle 101, as exemplarily shown in FIG. 5. The different screen parts/pieces from down to up may have different weight, thickness and/or material. E.g. lower component may form a cover and/or stowage element, a middle component may form an armrest and/or an upper component of the privacy screen 11 may form a privacy wall 10 or separating wall.

Furthermore, each seat unit M1 to Mn may comprise one of the table structures T1 to Ta. The table structure T1 to Ta is configured as a foldable or movable table 12. The table 12 is movable between a stowed position and a use position. For instance, the table structure T1 to Ta can be arranged adjacent each of the seat assemblies S1 to Sn, for example within the corresponding console. Optionally or additionally, the table structure T1 to T4 is arranged on a rear side of each console that means above each of the footwells 4, whereas the table structure T1 to T4 can be deployed towards a passenger seated behind the said footwell 4.

FIGS. 2A to 2D show in each case a schematic top view of different seat units M1 to M4.

FIGS. 3A to 3E show in each case a perspective view of different seat units M1 to M4.

According to the disclosure, a plurality of similar or different seat units M1 to Mn in at least one column C1 to Cx and/or in a vehicle cabin 100 are configured in such a manner that in an assembled state of the different seat units M1 to Mn each of the seat units M1 to Mn has a congruent ground plan or identical outer dimension. In particular, such a congruent and/or identical configuration of the different seat units M1 to Mn allows a variable arrangement of the different seat unit M1 to Mn, in particular a wide variety of different layouts to be created from a relatively small set or catalogue of components C.

Moreover, each of the seat units M1 to Mn are configured to have essentially common outer dimensions, wherein each seat unit M1 to Mn is adapted to be assembled in at least two different orientations of a corresponding seat 3 with respect to the vehicle cabin 100. In particular, the orientation of the corresponding seat 3 relates to one of an angled and/or forward facing orientation of the seat 3 with respect to the longitudinal axis x, LA of the cabin 100. Additionally or optionally, each seat unit M1 to Mn is adapted to be assembled in at least two different locations of the corresponding seat 3 with respect to the cabin 100, in particular to the longitudinal axis x, LA, within the cabin 100.

Figure 2A:
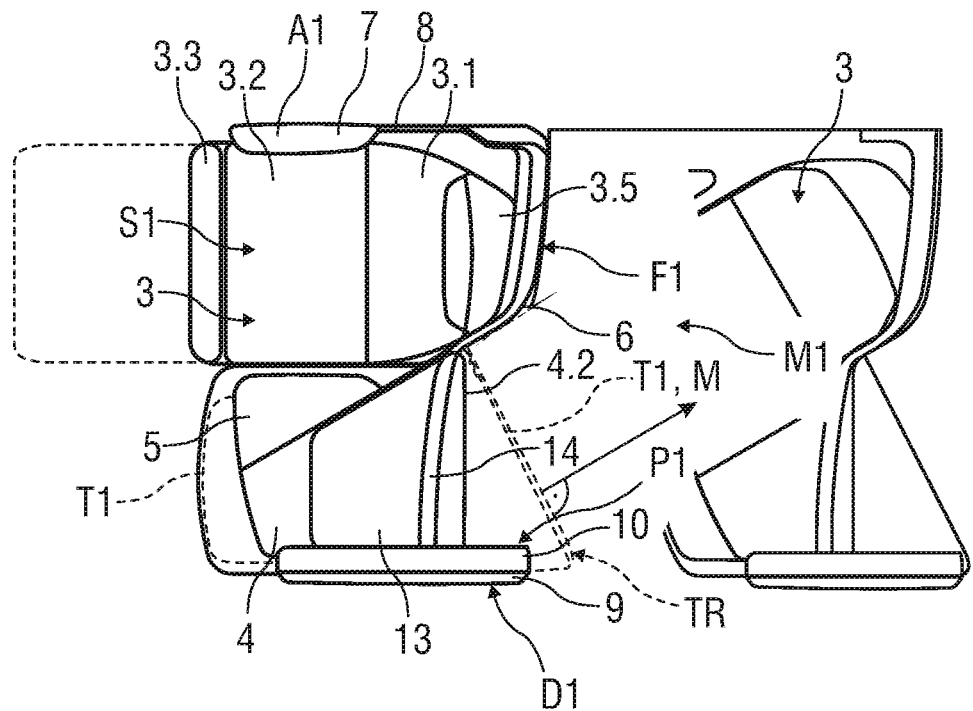
FIGS. 2A to 2D show in each case a schematic top view of different seat units.
Figure 2B:
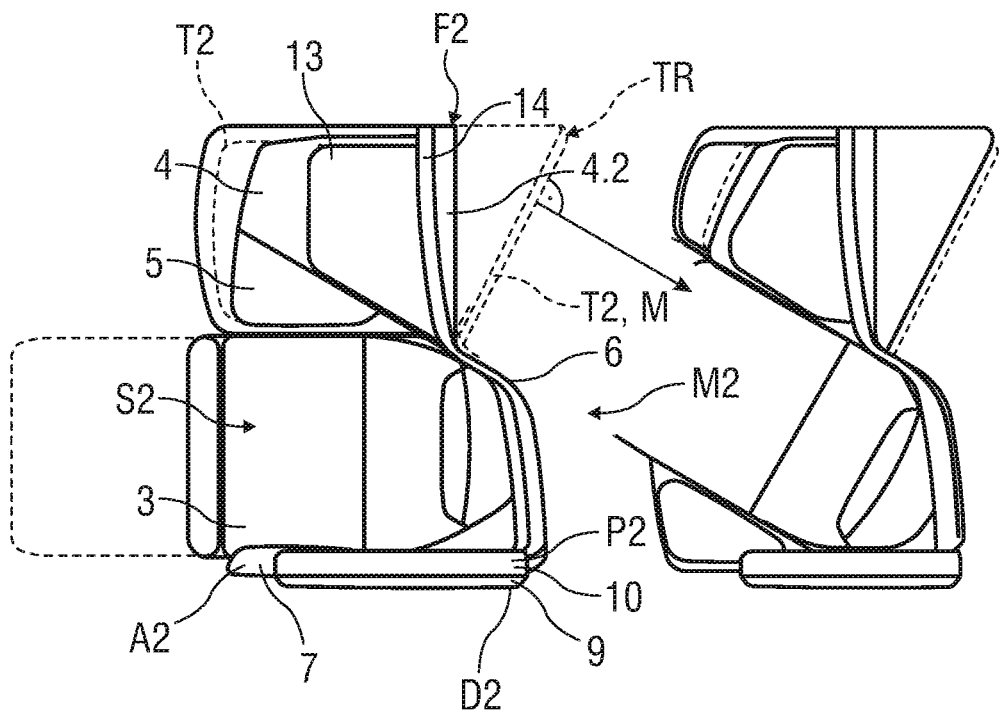

For example, FIGS. 2A and 2B show each a forward facing seat unit M1, M2, whereas the orientation of the seat 3 is forward facing, particularly in the flight direction FD. The location of the seat 3 of each of the forward facing seat units M1, M2 is opposite to each other. Therefore, the seat units M1, M2 are adapted to be assembled with identically orientated seats 3, whereas the locations differ from each other, particularly with respect to each of the seat units M1, M2.

Exemplarily, each of the forward facing seat units M1, M2 comprises a transition module TR which is arranged at a rear wall of the wall structure 6. Particularly, the transition module TR is arranged behind the console providing the footwell 4 for the rear passenger.

As shown in the FIGS. 2A and 2B, the transition modules TR of each of the forward facing seat units M1, M2 are configured to adapt to and align towards an angled seat 3 arranged in the back.

Figure 2C:
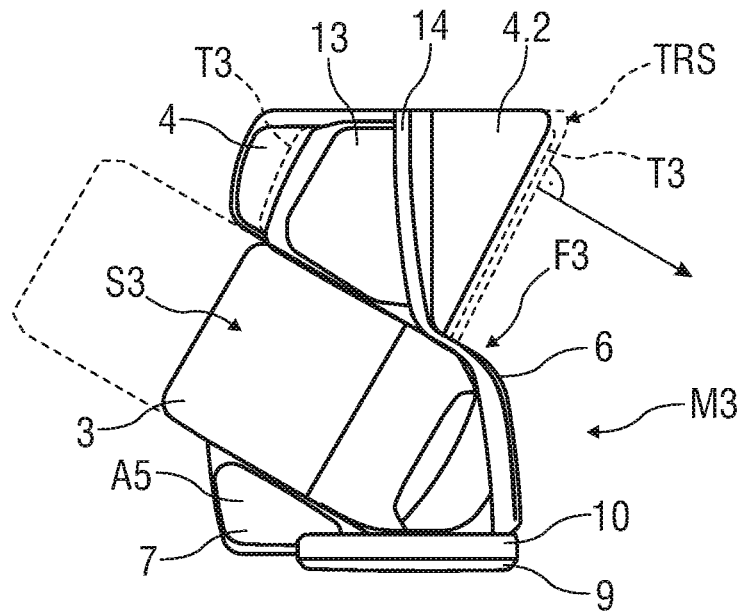
Figure 2D:
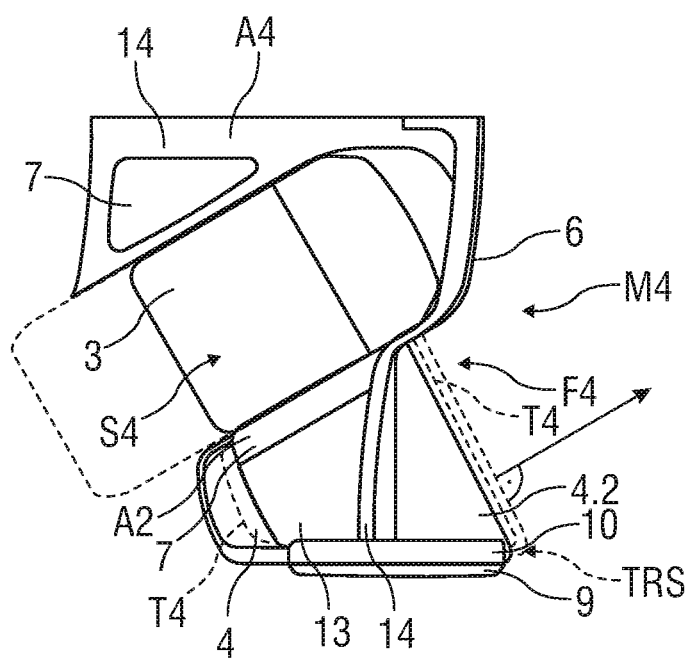

In particular, the transition module TR is configured to link the forward facing seat 3 arranged in front of the wall structure 6 and an angled seat 3 arranged behind the wall structure 6. In particular, the transition module TR allows a transition between an inline seat unit, particularly the forward facing seat unit M1 or M2 with an angled or herringbone seat unit, such as inwardly and outwardly angled seat units M3 or M4 as shown in FIGS. 2C and 2D with an angled seat 3.

For example, the transition module TR is one of an add-on furniture part which is detachable mounted to the console and/or the wall structure 6. Thereby, by detaching the transition module TR off the corresponding wall structure 6 and console, this console is adapted to be aligned with a rear forward facing seat unit M1 or M2.

Optionally, the transition module TR and the console and/or the wall structure 6 are configured as a one-piece furniture part of the corresponding, particularly forward facing/inline seat unit M1 and M2. Optionally, the console and the wall structure 6 are assembled to a common transition module TR.

In particular, the forward facing seat 3 is one of a termed inline seat. The console of the inline seat is arranged adjacent to the inline seat, whereas a longitudinal axis of the console as well as a longitudinal axis of the inline seat is each parallel to a longitudinal axis x, LA of the cabin 100. In particular, a seat-facing side of the console is adjacent, particularly aligned to a console-facing side of the seat 3. Further, the forward facing seat 3 has a front seat portion 3.6 which is at least substantially on same level as a front surface of the console. Therefore, the forward facing seat 3 is distanced from the wall structure 6 at least between 15 cm and 25 cm, in particular about 18 cm. In particular, a space between the wall structure 6 and behind the forward facing seat 3 can be used to mount one of a seat support structure and/or seat mechanics, cable joints for seat kinematics or the like.

Moreover, the wall structure 6 is substantially asymmetrically shaped. For instance, the wall structure 6 can comprise one of an S-shape, whereas the S-shape comprises asymmetrical portions.

In a further embodiment, the transition module TR comprises at least two not further shown housings to receive a monitor M and the table structure T1 or T2. Particularly, the table structure T1, T2 can be arranged, particularly stowed and deployed, underneath the monitor M. For example, the monitor M and the table structure T1, T2 are arranged perpendicular to a longitudinal axis of the angled seat 3.

In a general embodiment, the wall structure 6 is configured to accommodate the monitor M for the passenger of the rear seat 3, wherein the monitor M is arranged perpendicular to a longitudinal axis of the seat 3.

Figure 6:
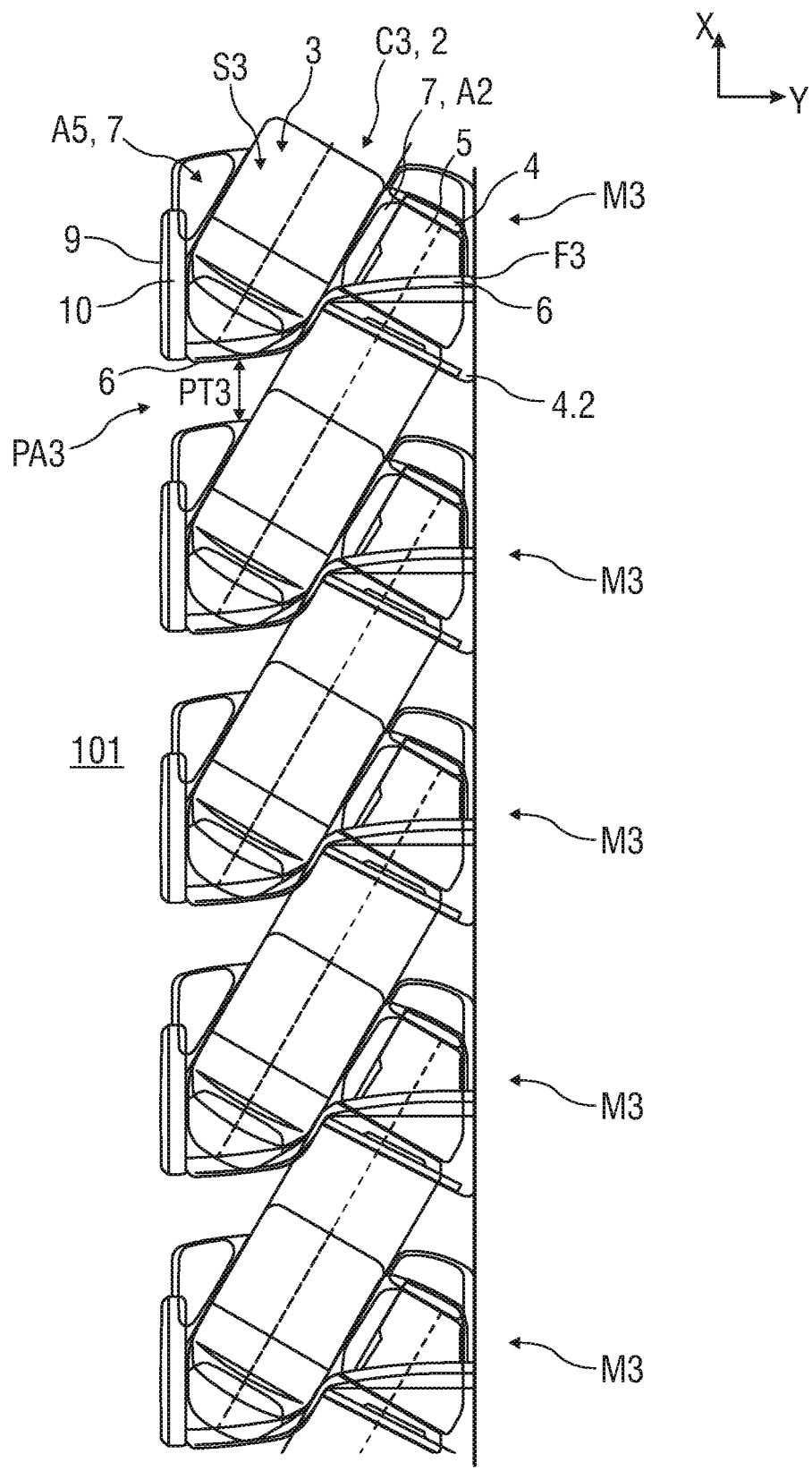
Figure 7:
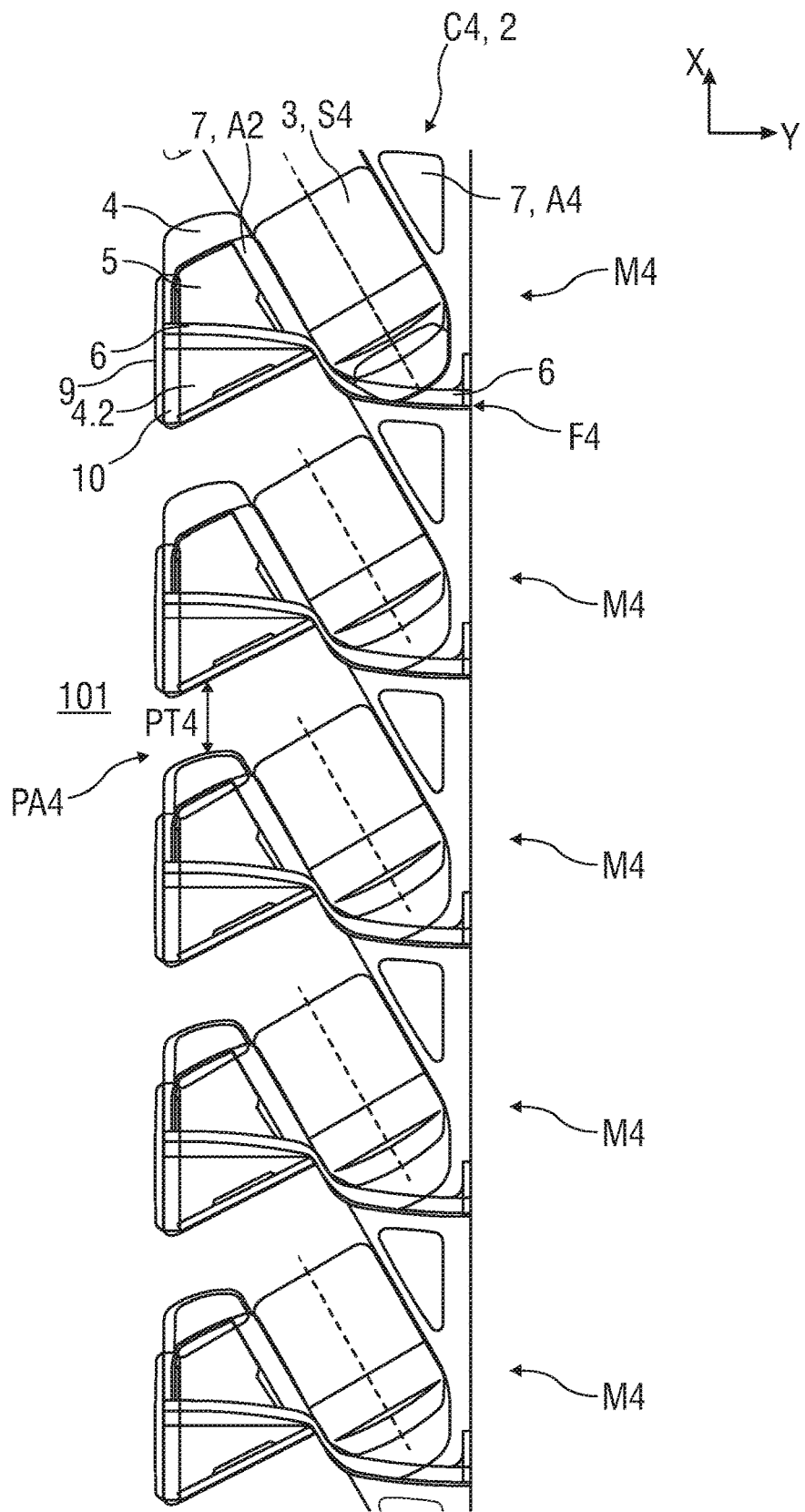

According to another embodiment, several angled seat units M3, M4 are identically angled and arranged behind each other, exemplarily shown in FIGS. 6 and 7. Thereby, the transition module TR of the forward facing seat units M1, M2 are configured to adapt an angle, particularly the same angle as the several angled seat units M3, M4 arranged identically behind each other. This improves an optical appearance of the passenger seating arrangement 2. Exemplarily, FIGS. 2C and 2D shows a rear panel 4.2 of the footwell 4, e. g. the console, of the angled seat units M3, M4. The rear panel 4.2 comprises at least one of a same shape TRS, dimensions and angled portion as the transition module TR of the forward facing seat units M1, M2 as shown in FIGS. 2A, 2B.

In an exemplary embodiment, the angled seat 3 in a bed position is aligned to the rear wall of the wall structure 6, particularly to a center portion of the S-shaped wall structure 6. In particular, a side surface of the angled seat 3 in bed position is partially adjacent to the center portion of the wall structure 6, following a substantially even/straight center portion of the S-shaped wall structure 6.

Moreover, the FIGS. 2C and 2D show each an angled seat unit M3, M4, whereas the orientation of the seat 3 is angled with respect to the longitudinal axis x, LA of the cabin 100. In particular, depending on an orientation facing towards an aisle 101 or away from the aisle 101, each of the angled seat units M3, M4 can be one of a termed inwardly or outwardly angled seat unit M3, M4. The location of the seat 3 of each of the angled seat units M3, M4 is opposite to each other. Thereby, the seat units M3, M4 are adapted to be assembled with different orientated seats 3, whereas the locations differ from each other, exemplarily with respect to each of the seat units M3, M4.

Furthermore, the different seat units M1 to Mn are configured such that each of them having some components C of the assembly set 1 that can be used to create different cabin layouts, e.g. inline/outline/herringbone seating combinations.

In particular, different seat shell structures F1 to Fm, e.g. furniture parts, comprise a number of common basic equipment parts, e.g. identical panels 4.2, identical wall structures 6, identical armrests 7, privacy doors 9, privacy walls 10 and/or privacy screens 11, tables 12, add-on furniture parts 13 and/or support surface portion 14 for each seat unit M1 to Mn.

For example, at least the wall structure 6 of the forward facing seat unit M1 and the wall structure 6 of the angled seat unit M4 are substantially identical. When a customer desires to change the seat 3 of the forward facing seat unit M1 to an angled seat 3, at least the wall structure 6 can be reused and vice versa. Thereby, the wall structure 6 of the forward facing seat unit M2 can be used providing space for the angled seat 3 of the angled seat unit M3 and vice versa. Particularly, same congruent ground plan or identical outer dimension as the other seat units M1 to Mn can be provided even when transferring from one of the forward facing seat unit M1, M2 to one of the angled seat units M3, M4 and vice versa.

According to another aspect, the different seat shell structures F1 to Fm, e.g. furniture parts, are optionally assembled with respect to each other such that at least dimensions of each seat unit M1 to Mn remain substantially the same.

Each seat unit M1 to Mn comprises a longitudinal side bordering an aisle 101 of the vehicle cabin 100 (shown in FIGS. 2A to 12). On this longitudinal side of the seat unit M1 to Mn, one of the door structures D1 to Dk is arranged.

In an exemplary embodiment, each seat unit M1 to Mn comprises at least one console or seat shell structure F1 to Fm and one seat assembly S1 to Sn arranged adjacent to the seat shell structure F1 to Fm.

Moreover, each or some of the seat units M1 to Mn is/are one of the forward facing seat unit M1 to M2, wherein at least a longitudinal axis of the seat 3 of one of the forward facing seat units M1 to M2 is parallel to a longitudinal axis LA of the vehicle cabin 100 (shown in FIGS. 8 to 12).

In another exemplary embodiment, each or some of the seat units M1 to Mn is/are configured as the angled seat unit M3 to M4, wherein at least the longitudinal axis of the seat 3 of one of the angled seat units M3 to M4 is angled relative to the longitudinal axis LA of the vehicle cabin 100. The seat 3 of an angled seat unit M3 to M4 may be angled inwardly or outwardly.

As best seen in FIGS. 2A to 2D and 3A to 3D, for each seat unit M1 to Mn, a width W, e.g. a maximum width, of the seat unit M1 to Mn in a transverse direction of the cabin 100, a length L, e.g. a maximum length, and/or a height H, e.g. a maximum height, of the seat unit M1 to Mn, in particular at least the rear shell wall structure 6 is substantially identical. In particular, the seat units M1 to Mn of each layout provide common utility surface dimensions.

Figure 3A:
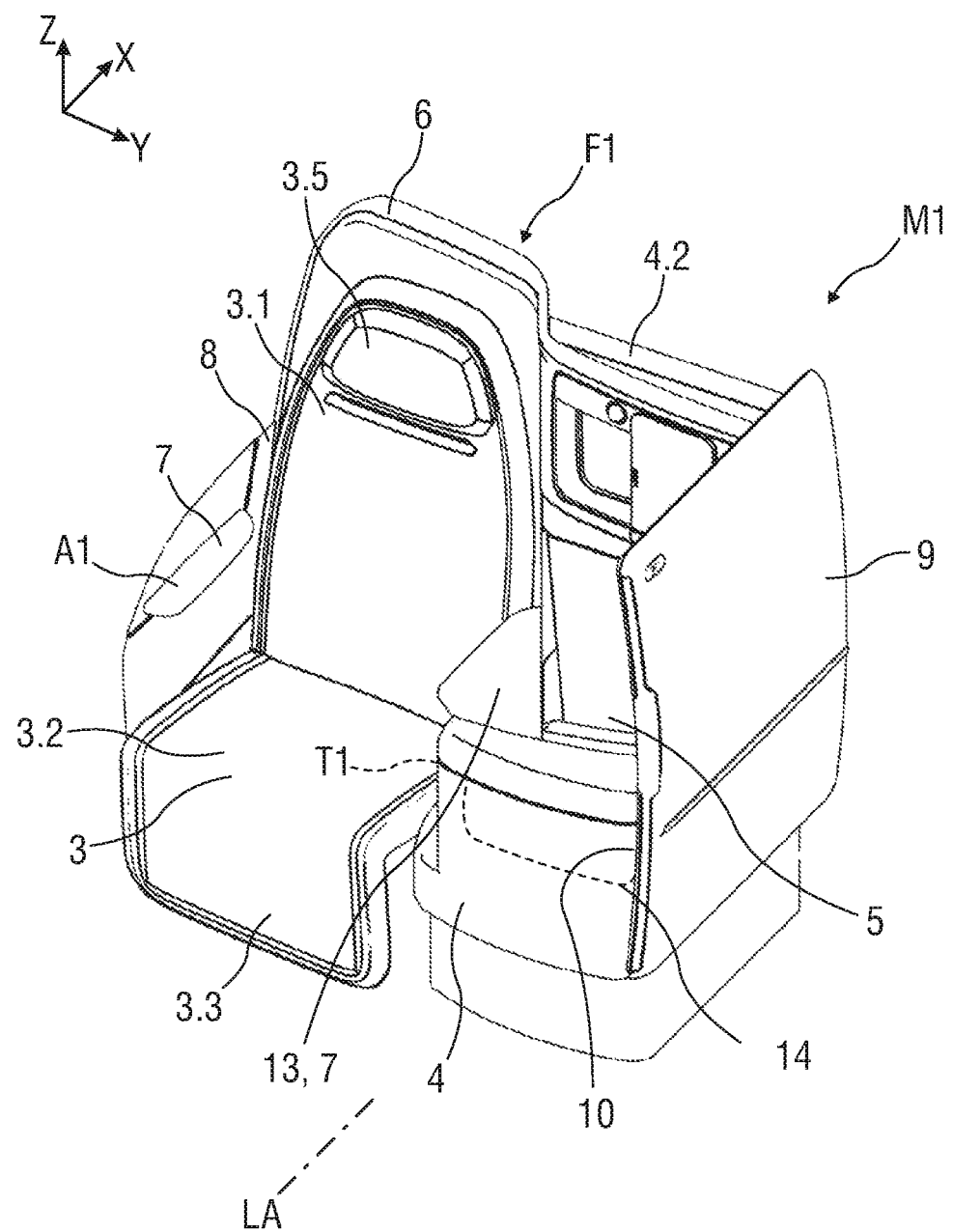
FIGS. 3A to 3E show in each case a perspective view of different seat units.
Figure 3B:
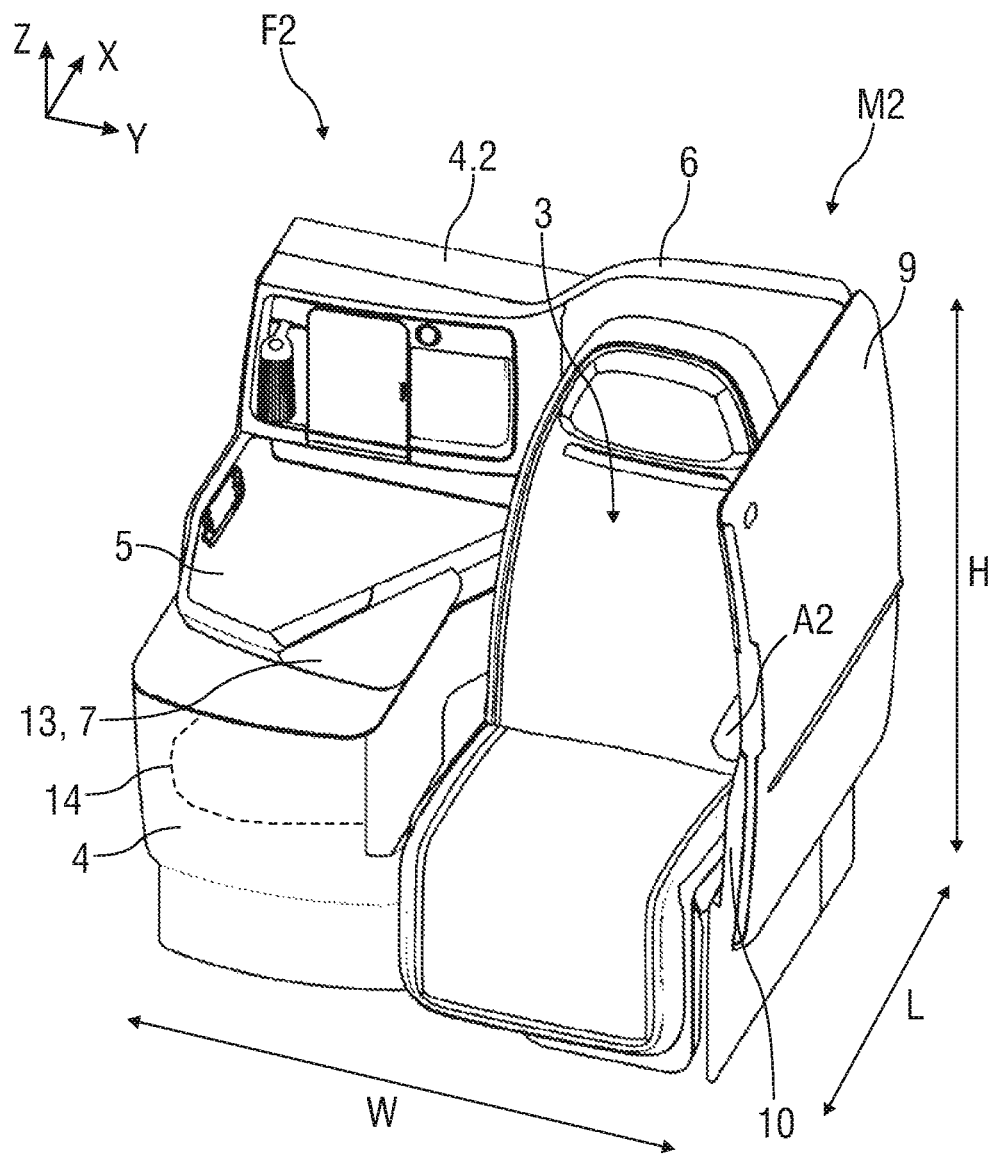

In particular, FIGS. 2A and 2B show a top view and FIGS. 3A and 3B show a perspective view of a seat unit M1 or M2, each of the seat unit M1 or M2 includes a seat 3 which is essentially parallel to a wall structure 6, e.g. a rear wall or panel, arranged on a backside of the seat 3 (FIGS. 2A, 3A, 2B, 3B) and/or to a privacy divider P1, e.g. a privacy wall 10, side wall or panel 4.2, arranged on a lateral side of a footwell 4 (FIGS. 2A, 3A) or of the seat 3 (FIGS. 2B, 3B). The wall structure 6 and the privacy divider P1 may be formed as a pre-assembled sub-module of the respective seat shell structure F1 or F2.

The wall structure 6 as a separation panel to another seat unit M1 to Mn behind the seat 3 in the same column C1 and the lateral privacy divider P1 as bordering wall to an adjacent aisle are configured as furniture parts which at least partially surrounds the seat 3 and provides a passenger access PA3. A console configured as the footwell 4 and/or storage structure is adjacent to the seat 3 may be pre-assembled with the rear wall structure 6 and/or the lateral privacy divider P1 and provides at least a utility surface for the corresponding passenger of the seat 3 and a stowage compartment adjacent to the seat 3 and the footwell 4 for a rear passenger seated behind.

Optionally, each seat unit M1 or M2 may comprise an add-on furniture part 13 providing different shapes for different kinds of seat units M1 or M2. In particular, the add-on furniture part 13 of seat unit M1 comprises an add-on armrest part or a side surface providing different dimension to fit into each of the desired seat units M1 or M2 and to cover free space.

Furthermore, the footwell 4, e.g. the console, comprises an open space 4.1 at a rear side facing towards the passenger seated behind, such that the footwell 4 is accessible for a rear passenger. For instance, the adjustable seat 3 can be brought into the sleeping position, in particular a bed position, such that the seat 3 is partially projecting into the footwell 4. Therefore, the footwell space of the console can be seen as an extension space for the rear passenger. The footwell 4 may comprise a support surface portion 14 which is fixed inside the footwell space. When the seat 3 is brought into the sleeping position, the leg-rest 3.3 comes into contact with the support surface portion 14 of the footwell 4 such that a sleeping surface is extended for the rear passenger. The support surfaced portion 14 has a corresponding outer rear shape with an outer front shape of the leg-rest 3.3 and an outer shape with an inner shape of the footwell 4.

Figure 3C:
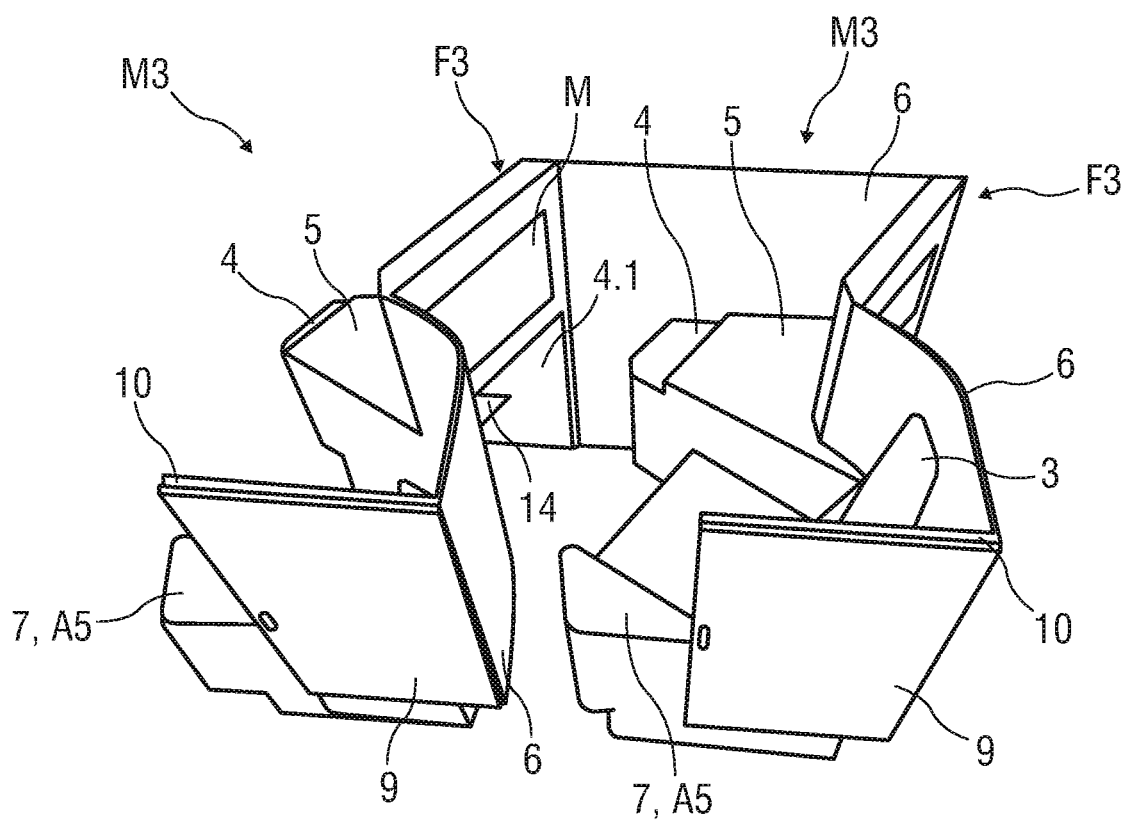
Figure 3D:
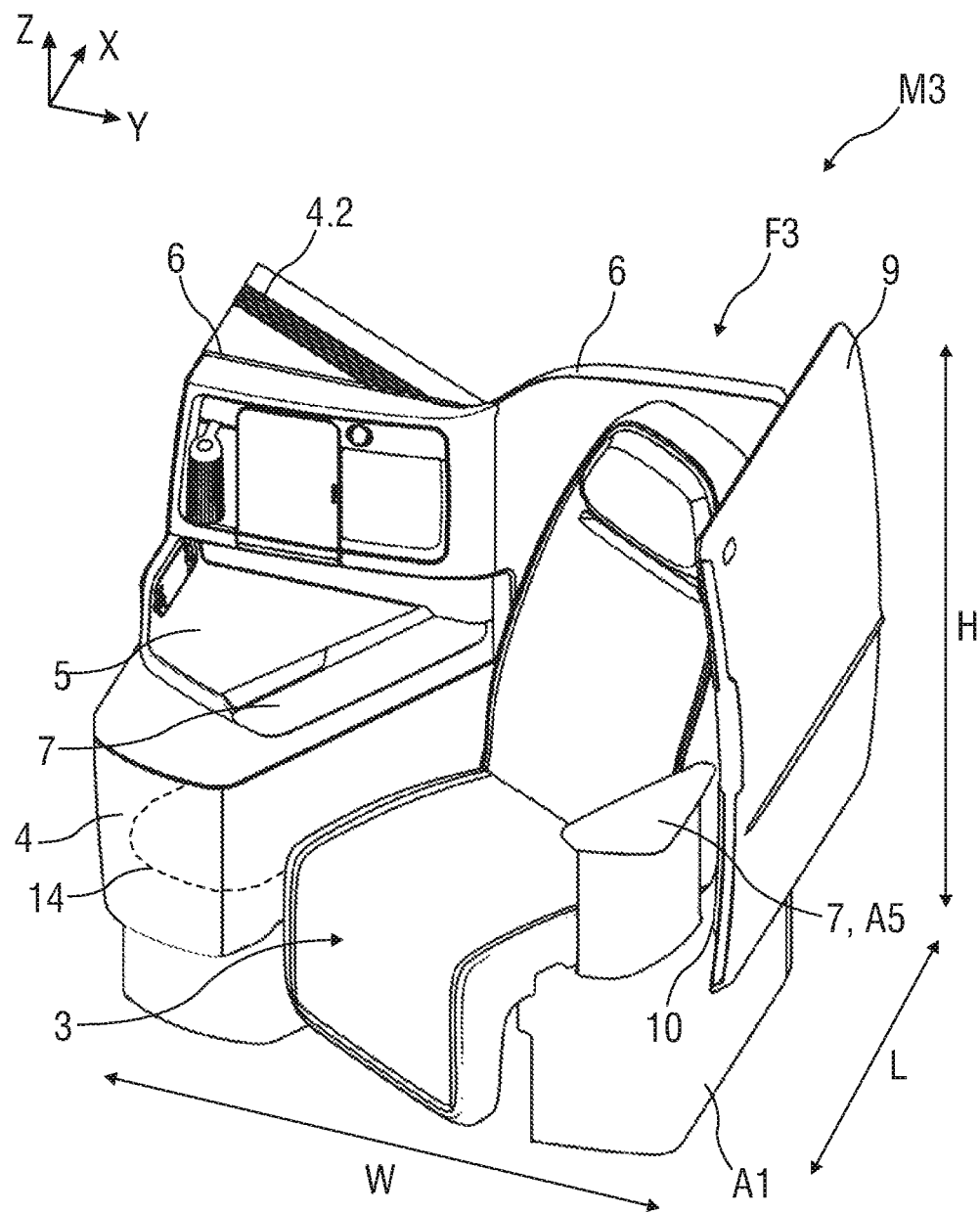

In particular, FIGS. 2C and 2D show a top view and FIGS. 3C and 3D show a perspective view of a seat unit M3 or M4, each of the seat unit M3 or M4 includes a seat 3 which is angled with respect to a wall structure 6, e.g. a rear wall or panel 4.2, arranged on a backside of the seat 3 (FIGS. 2C, 3C, 2D, 3D) and/or to a privacy divider P1, e.g. a privacy wall 10, side wall or panel, arranged on a lateral side of a footwell 4 (FIGS. 2C, 3C) or of the seat 3 (FIGS. 2D, 3D).

Figure 3E:
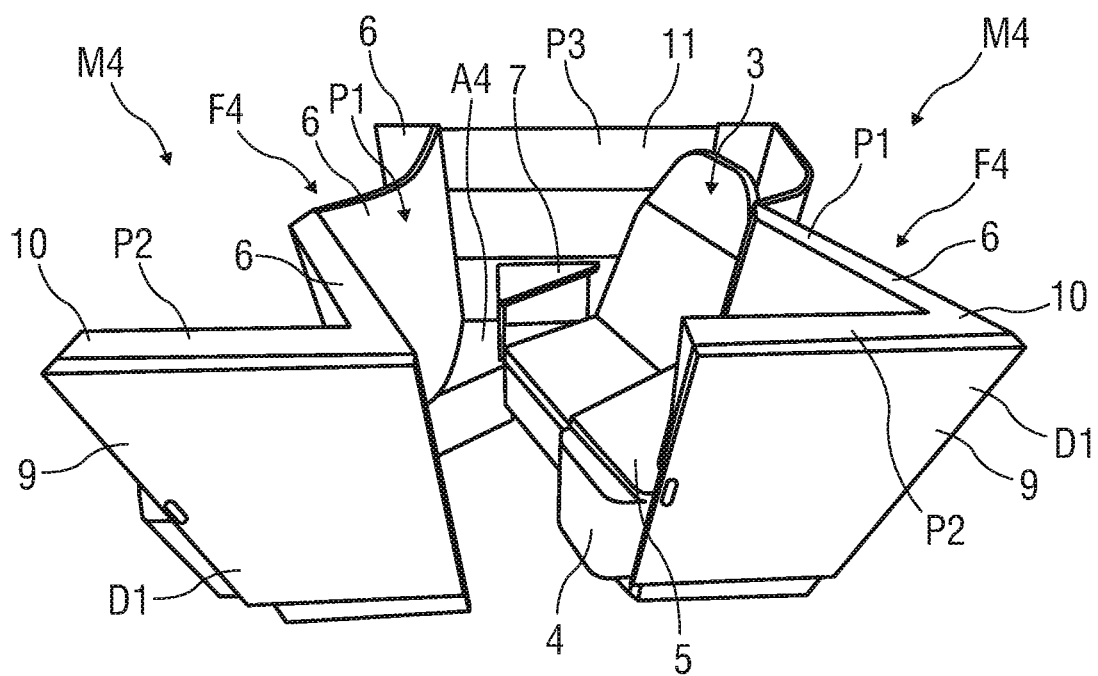

FIGS. 2C, 3C, each of them shows an outwardly angled seat configuration. FIGS. 2D and 3E, each of them shows an inwardly angled seat configuration. Each of the mentioned configurations depends on an orientation of the seat 3 with respect to the aisle 101. Particularly, each of the configurations comprises a seat 3 positioned at an angle of about 30° to 50°, in particular 45°, with respect to the aisle 101, e.g. facing away from the aisle 101 (=outwardly angled seat) or towards the aisle 101 (=inwardly angled seat).

The wall structure 6 and the privacy divider P3 may be formed as a pre-assembled sub-module of the respective seat shell structure F3 or F4.

The wall structure 6 as a separation panel to another seat unit M3 to Mn behind the seat 3 in the same column C1 and the lateral privacy divider P1 as bordering wall to an adjacent aisle 101 or a cabin side wall are configured as furniture parts which at least partially surrounds the seat 3 and provides a passenger access PA1 to PA4. A console configured as the footwell 4 and/or storage structure is adjacent to the seat 3 may be pre-assembled with the rear wall structure 6 and/or the lateral privacy divider P1 and provides at least a utility surface for the corresponding passenger of the seat 3 and a stowage compartment adjacent to the seat 3 and the footwell 4 for a rear passenger seated behind.

Additionally, each of the seat units M3 or M4 comprises a movable armrest 7 which provides a sleeping surface extension in a stowed position.

FIGS. 4 to 7 show in each case a top view of an embodiment of different passenger seating arrangements 2 in a column C1 to C4.

FIGS. 4 and 5 show passenger seating arrangements 2 having a number of forward facing seat units M1 or M2 arranged in an alternating manner in the same column C1 or C2.

FIGS. 6 and 7 show passenger seating arrangements 2 having a number of same angled seat units M3 or M4 arranged in a staggered manner in the same column C3 or C4.

Each of the seat units M1 to M4 of each of the passenger seating arrangements 2 are created by common components C of the assembly set 1.

Each of the seat units M1 to M4 of each of the columns C1 to C4 are arranged next to an aisle 101 in a cabin 100.

The seat units M1 to M4 of each of the columns C1 to C4 are distanced from each other by a pitch PT1 to PT4 providing a passenger access PA1 to PA4. In particular, each seat 3 of the corresponding seat unit M1 to M4 is separately accessible by its passenger access PA1 to PA4 from a corresponding aisle 101.

The passenger access PA1 or PA2 extends essentially perpendicular to the corresponding aisle 101. The passenger access PA3 or PA4 are angled with respect to the corresponding aisle 101. In particular, the shown transition module TR in FIGS. 2A, 2B is configured to provide an angled passenger access such as the passenger access PA3 or PA4, whereas passenger access behind the transition module TR is substantially perpendicular to the angled seat 3.

Each of the seat units M1 to M4 has a congruent ground plan or identical outer dimension. In particular, the assembly set 1 comprises two primary seat units M1 to M2, in particular furniture or seat shell structure F1 and F2. The assembly set 1 may comprise two further primary seat units M3 to M4, in particular seat shell structures F3 and F4, which are mirrored with respect to the other primary seat units M1 to M2, in particular the primary seat shell structures F1 to F2.

These primary seat units M1 to M4, e.g. the seat shell structures F1 to F4, are similar in all dimensions, e.g. in all X, Y and Z dimensions. These seat units M1 to M4 share similar styling identity and character. Further, these seat units M1 to M4 house common components C, in particular common assemblies such as suite privacy doors 9, seat controls for the seat 3 and bed positions, reading lights, suite lamps, upper furniture and top shell cappings. In other words: Privacy doors 9, kinematics of the seats 3 and/or door structures D1 to D4, infotainment units and/or tables 12 are repeatable common functional parts or elements.

The seat units M1 to M4 house the same seat assembly S1 to S4 with the same seat 3. In particular, each of the seat assemblies S1 to S4 has the same wire harnessing and same build methodology.

The key differences in the seat units M1 to M4 created by the components C of the assembly set 1 are the orientation, e.g. angle of the seats 3 with respect to the aisles 101 in the cabin 100 and/or the longitudinal axis LA of the cabin 100 or aircraft centreline.

The primary seat units M1 to M4 ensure alignment of each seat units M1 to M4 behind each other and next to each other in an angled manner and/or in a staggered manner, e.g. in an outboard facing herringbone arrangement (shown in FIGS. 7, 8 and in partial in FIGS. 8-12), in an inboard facing herringbone arrangement (shown in FIG. 9 and in partial in FIGS. 10, 12) and/or in a staggered in-line arrangement (shown in partial in FIGS. 7, 8-12).

Using of the above described assembly set 1 of common components C and/or parts, common dimensions and styling permits usually dissimilar seat types to be arranged together in the same cabin 100. The unique dimensions and/or connective geometry of the seat units M1 to Mn allows herringbone and inline seating arrangements to join end to end in a single column C1 to C4 and also creates unique seating arrangements 2 in this respect. Further, the unique dimensions and/or geometry of a few number of seat units M1 to M4 allows cabin optimisation and a wide variety of different cabin layouts to be created from a relatively small catalogue of common components C:

Due to the different orientations of the seats 3 of the seat units M1 to M4, a monitor M of each of the seat units M1 to M4 is orientated similarly to the orientation of the corresponding seat 3 of the corresponding seat unit M1 to M4 and positioned on a seat shell structure F1 to F4 of an identical seat unit M1 to M4 in front of the corresponding seat 3.

The assembly set 1 comprising the different common components C may be used to create a number of different seating layouts or passenger seating arrangements 2 within the cabin 100 as for example shown in FIGS. 8 to 13 and described below:

FIGS. 8 to 13 show in each case a top view of an embodiment of a section of a passenger seating arrangement 2 in a cabin 100, e.g. a vehicle cabin or aircraft cabin.

FIG. 8 shows a section of a passenger seating arrangement 2. The cabin section comprises next to each cabin wall of the cabin 100 a single column C1 and C4 having identically outwards angled seat units M3. In particular, FIG. 8 shows the passenger seating arrangement 2 comprising a number of seat units M1 to M3, whereas the cabin 100 has a mirror axis MA. Each of the respective seat units M1 to M3 is mirrored along the mirror axis MA. In a center section 18 of the cabin 100, two columns C2 and C3 are provided with forward facing seat units M1 and M2. The forward facing seat units M1 and M2 are arranged behind each other in the longitudinal direction of the cabin 100 and are staggered.

Depending on assistance and monumental structures 17, e.g. interior structures, galley structures, interior trims or fittings within the cabin 100, it is desirable to position the seat units M1 and M2 such that the passenger seating arrangement 2 is optimised. For this purpose, the forward facing seat units M1 and M2 may be arranged in a front row section 16 and/or the rear row section (not shown) of the cabin 100 to take up less width. The interior or monumental structures 17 can comprise a galley, lavatories, doors, emergency exits, staff storage, electronic compartments etc.

Figure 9:
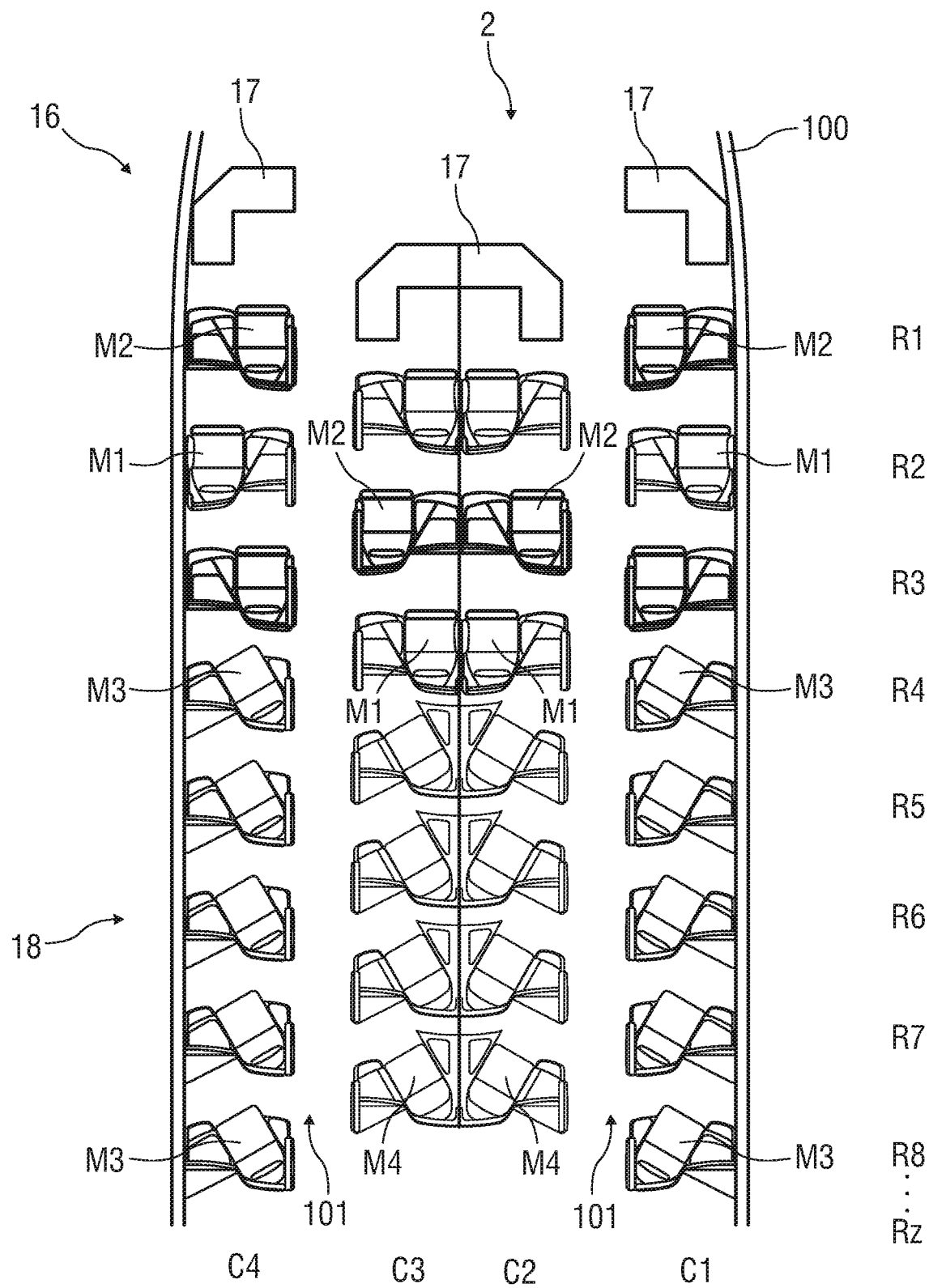

FIG. 9 shows another section of a passenger seating arrangement 2.

The cabin section comprises four columns C1 to C4 wherein at least two of the columns C2 and C3 are center columns and the other two are outer columns C1 and C4. Each of the columns C1 to C4 has in a front row section 16 three rows R1 to R3 comprising forward facing seat units M1 and M2 which are arranged behind each other in the longitudinal direction of the cabin 100 and are staggered.

Furthermore, each of the columns C1 to C4 has in a center section 18 four or five rows R4 to R7 or R8 of several outwardly and inwardly angled seat units M3 and M4.

Moreover, each of the seat units M1 to Mn are configured to have essentially common outer dimensions, wherein each seat unit M1 to Mn is adapted to be assembled in at least two different orientations of a corresponding seat 3 with respect to the vehicle cabin 100. In particular, the orientation of the corresponding seat 3 relates to one of an angled and/or forward facing orientation of the seat 3 with respect to the longitudinal axis x, LA of the cabin 100. Additionally or optionally, each seat unit M1 to Mn is adapted to be assembled in at least two different locations of the corresponding seat 3 with respect to the cabin 100, in particular to the longitudinal axis x, LA, within the cabin 100.

For example, each the forward facing seat unit M1, M2, whereas the orientation of the seat 3 is forward facing, particularly in the flight direction FD. The location of the seat 3 of each of the forward facing seat units M1, M2 is opposite to each other. Therefore, the seat units M1, M2 are adapted to be assembled with identically orientated seats 3, whereas the locations differ from each other, particularly with respect to each of the seat units M1, M2.

Moreover, each of the angled seat units M3, M4, whereas the orientation of the seat 3 is angled with respect to the longitudinal axis x, LA of the cabin 100. In particular, depending on an orientation facing towards an aisle 101 or away from the aisle 101, each of the angled seat units M3, M4 can be one of a termed inwardly or outwardly angled seat unit M3, M4. The location of the seat 3 of each of the angled seat units M3, M4 is opposite to each other. Thereby, the seat units M3, M4 are adapted to be assembled with different orientated seats 3, whereas the locations differ from each other, exemplarily with respect to each of the seat units M3, M4.

Furthermore, the different seat units M1 to Mn are configured such that each of them having some components C of the assembly set 1 that can be used to create different cabin layouts, e.g. inline/outline/herringbone seating combinations.

In particular, different seat shell structures F1 to Fm, e.g. furniture parts, comprise a number of common basic equipment parts, e.g. identical panels 4.2, identical wall structures 6, identical armrests 7, privacy doors 9, privacy walls 10 and/or privacy screens 11, tables 12, add-on furniture parts 13 and/or support surface portion 14 for each seat unit M1 to Mn.

For example, at least the wall structure 6 of the forward facing seat unit M1 and the wall structure 6 of the angled seat unit M4 are substantially identical. When a customer desires to change the seat 3 of the forward facing seat unit M1 to an angled seat 3, at least the wall structure 6 can be reused and vice versa. Thereby, the wall structure 6 of the forward facing seat unit M2 can be used providing space for the angled seat 3 of the angled seat unit M3 and vice versa. Particularly, same congruent ground plan or identical outer dimension as the other seat units M1 to Mn can be provided even when transferring from one of the forward facing seat unit M1, M2 to one of the angled seat units M3, M4 and vice versa.

According to another aspect, the different seat shell structures F1 to Fm, e.g. furniture parts, are optionally assembled with respect to each other such that at least dimensions of each seat unit M1 to Mn remain substantially the same.

Figure 10:
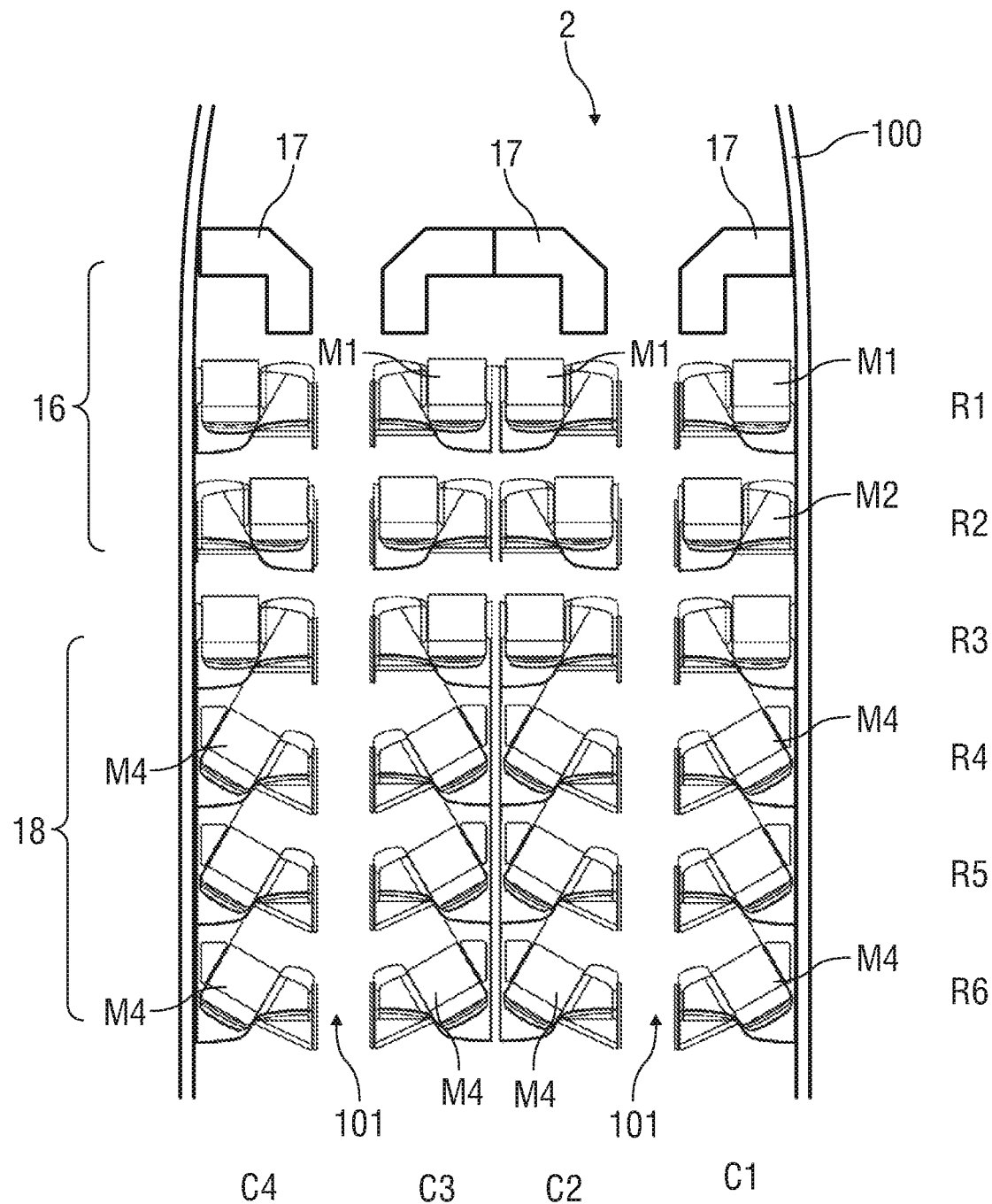

FIG. 10 shows another section of a passenger seating arrangement 2. The cabin section comprises four columns C1 to C4 wherein at least two of the columns C2 and C3 are center columns and the other two are outer columns C1 and C4. Each of the columns C1 to C4 has in a front row section 16 three rows R1 to R3 comprising forward facing seat units M1 and M2 which are arranged behind each other in the longitudinal direction of the cabin 100 and are staggered.

Furthermore, each of the columns C1 to C4 has in a center section 18 three rows R4 to R6 of several inwardly angled seat units M4.

Figure 11:
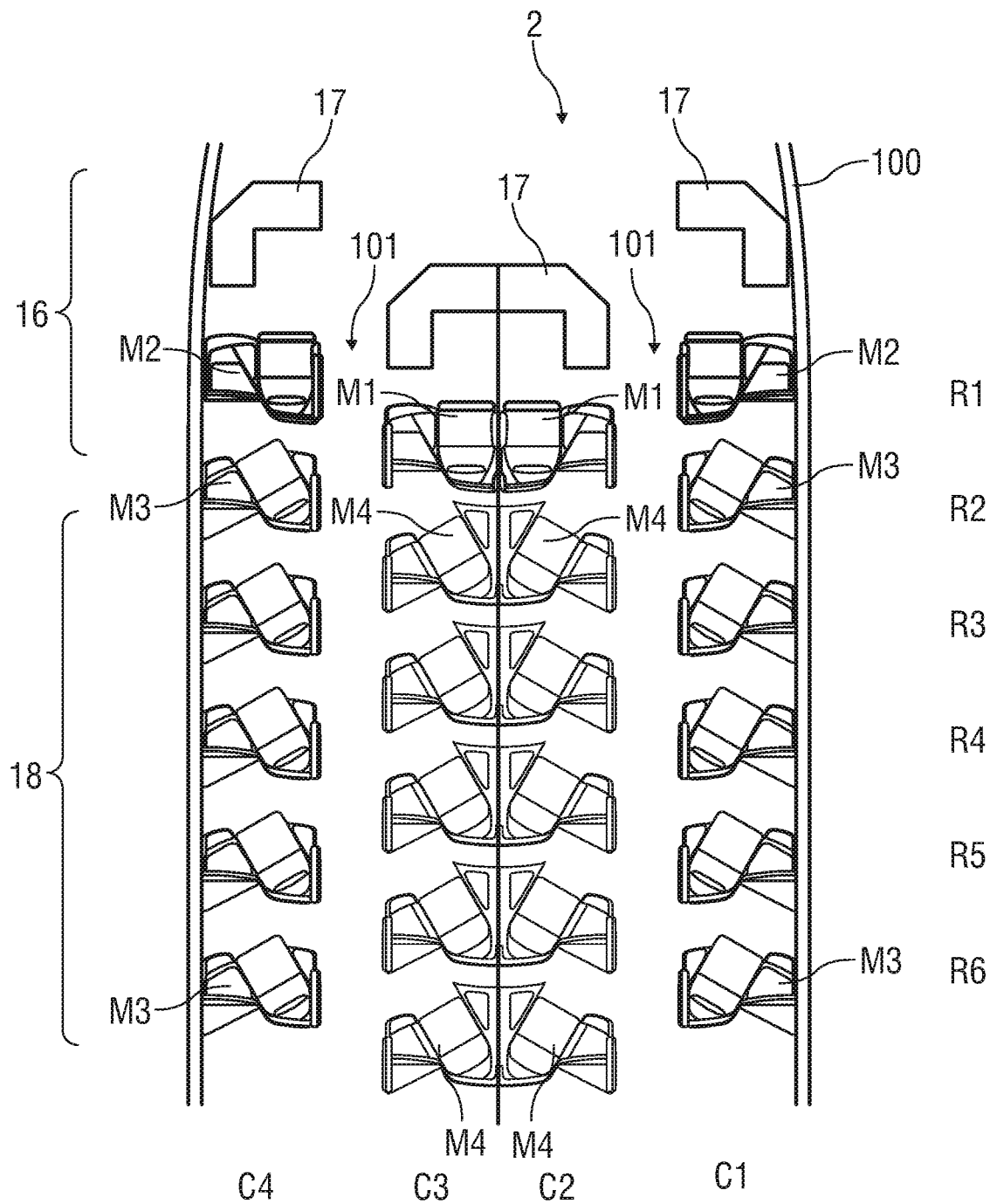

FIG. 11 shows a cabin section with four columns C1 to C4. At least two of the columns C2 and C3 are center columns and the other two are outer columns C1 and C4. Each of the columns C1 to C4 has, in a front row section 16, one row R1 comprising forward facing seat units M1 and M2.

Furthermore, each of the columns C1 to C4 has in a center section 18 five rows R2 to R6 of several outwardly and inwardly angled seat units M3 and M4 which are arranged behind each other in the longitudinal direction of the cabin 100 and are staggered.

Figure 12:
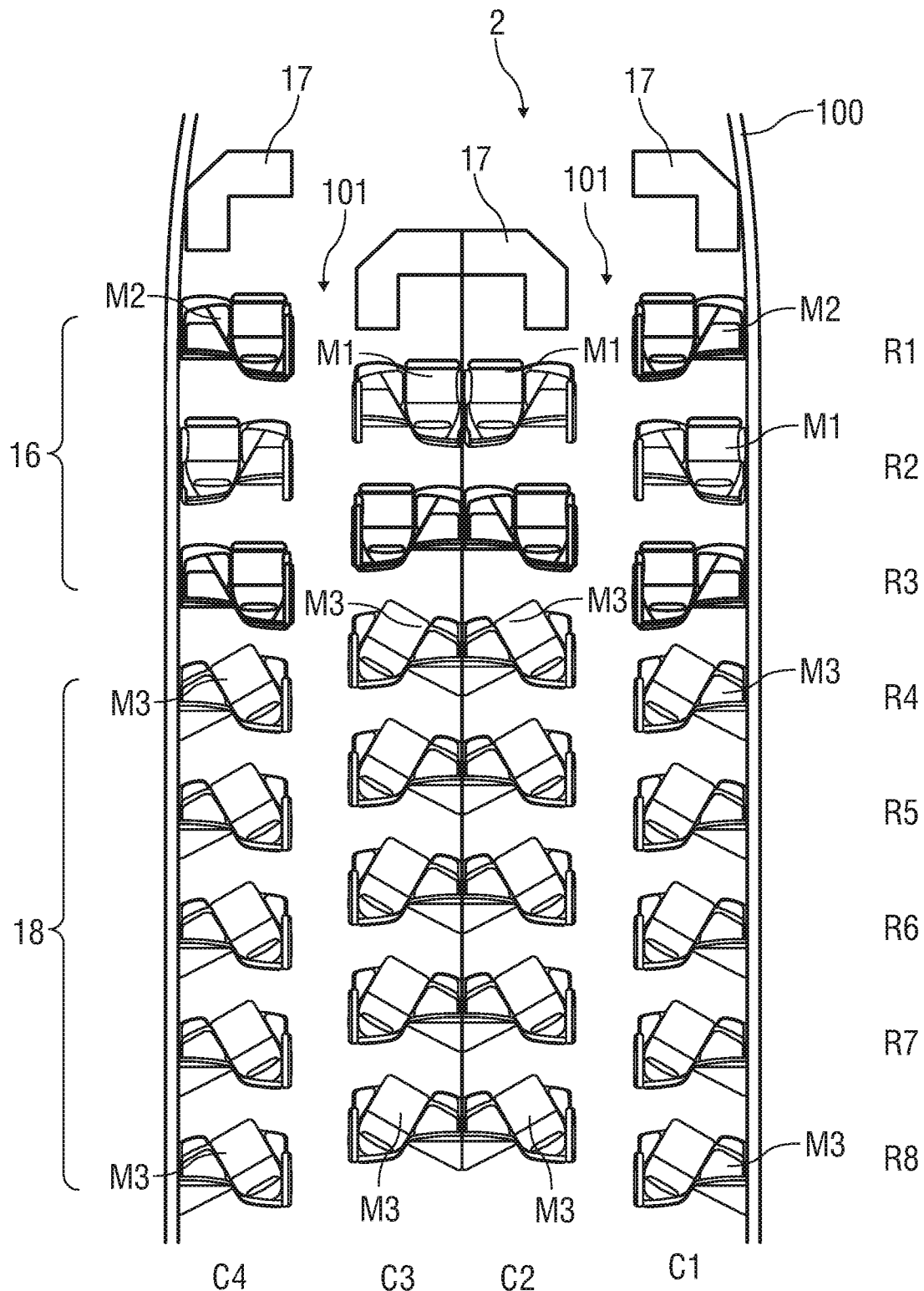

FIG. 12 shows a cabin section with four columns C1 to C4. At least two of the columns C2 and C3 are center columns and the other two are outer columns C1 and C4. Each of the columns C1 to C4 has in a front row section 16 two or three rows R1 to R3 comprising forward facing seat units M1 and M2.

Furthermore, each of the columns C1 to C4 has in a center section 18 six rows R3 to R8 of several outwardly angled seat units M3 which are arranged behind each other in the longitudinal direction of the cabin 100 and are staggered.

Figure 13:
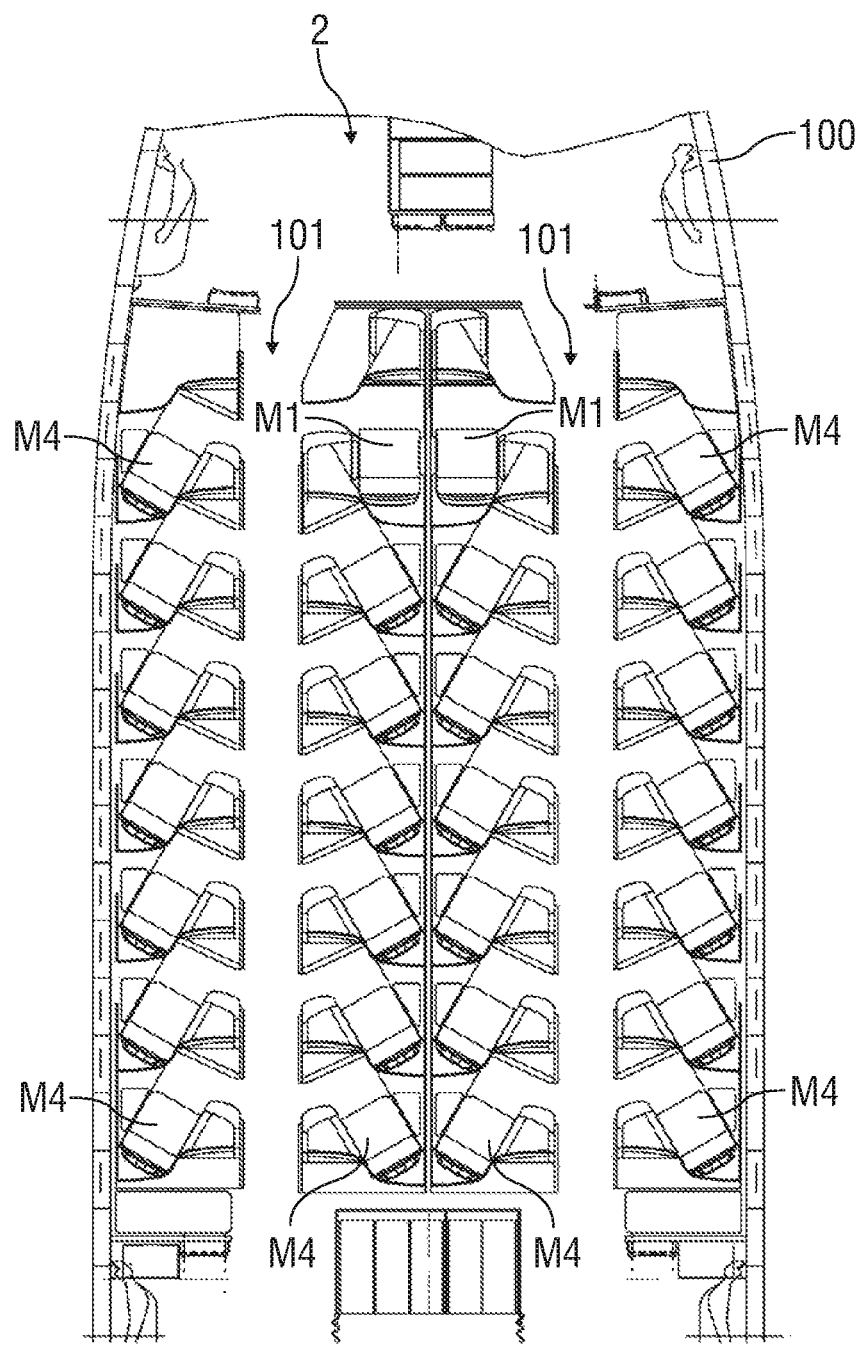

FIG. 13 shows a further embodiment of passenger seat arrangement 2 in a cabin 100 using the identical seat units M1 and M4 which are assembled in another manner so that another seating configuration is available as shown in FIGS. 8 to 12.

According to the disclosure, any other passenger seating arrangements 2 are possible and comprising outer columns C1, C4 and/or inner center columns C2 and C3 with variable and/or identical arrangement of seat units M1 to Mn—forward facing seat units M1, M2, inwardly and/or outwardly angled seat units M3 and M4. The seat units M1 to Mn are created by common components C of the assembly set 1. Furthermore, the seat units M1 to M4 are primary seat units M1 to M4 having at least seat shell structures F1 to F4 which are similar in all dimensions, e.g. in all X, Y and Z dimensions. These seat units M1 to M4 share similar styling identity and character.

In other words: A number of different overall seating layouts within the cabin 100 is configurable by optionally assembling a number of common furniture parts with respect to each other depending on an orientation of the seat 3 within desired kind of seat units M1 to Mn.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A seat unit for a passenger seating arrangement provided within a vehicle cabin, the seat unit comprising:
    a first longitudinal side bordering an aisle of the vehicle cabin;
    a forward facing seat arranged at the first longitudinal side and extending laterally towards a second longitudinal side;
    a first console arranged adjacent to the forward facing seat and extending laterally between the forward facing seat and the second longitudinal side; and
    a wall structure behind the forward facing seat and first console, the wall structure extending between the first longitudinal side and the second longitudinal side;
    wherein the seat unit is configured to link the forward facing seat and an angled seat;
    wherein the angled seat is arranged at the first longitudinal side and extends laterally towards the second longitudinal side behind the forward facing seat;
    wherein a second console is located adjacent to the angled seat behind the first console, the second console extending between the angled seat and the second longitudinal side, and
    wherein the first console provides a footwell for a passenger of the angled seat.

2. The seat unit according to claim 1, wherein the first console is configured with a transition module mounted to the first console behind the wall structure and above the footwell to allow a transition between the forward facing seat and the angled seat.

3. The seat unit according to claim 2, wherein the transition module includes a monitor arranged perpendicular to a longitudinal axis of the angled seat.

4. The seat unit according to claim 1, wherein the wall structure is configured to accommodate a monitor for the passenger of the angled seat.

5. The seat unit according to claim 4, wherein the monitor is movable with respect to the wall structure.

6. The seat unit according to claim 1, wherein each of the forward facing seat and the angled seat includes a separate passenger access along the first longitudinal side.

7. The seat unit according to claim 1, wherein the forward facing seat is distanced from the wall structure at least between 15 cm and 25 cm, in particular about 18 cm.

8. The seat unit according to claim 1, wherein a longitudinal axis of the angled seat is relatively angled with respect to a longitudinal axis of the vehicle cabin between 25° and 45°, in particular about 28° to 35°.

9. The seat unit according to claim 1, wherein the angled seat in a bed position is aligned to an outer surface of the wall structure.

10. The seat unit according to claim 1, wherein the wall structure, in particular a rear wall is substantially asymmetric.

11. The seat unit according to claim 1, wherein the forward facing seat and angled seat are adjustable between at least a seating position and at least a bed position.

12. A passenger seating arrangement for a vehicle cabin, in particular an aircraft cabin, the arrangement comprising a plurality of seat units arranged one behind another in one longitudinal column, wherein at least one seat unit according to claim 1 is a transition seat unit.

13. The passenger seating arrangement according to claim 12, wherein the arrangement includes a plurality of angled seat units having angled seats, the plurality of angled seat units located behind the forward facing seat of the transition seat unit and arranged one behind another in a longitudinal direction of the vehicle cabin.

14. The passenger seating arrangement according to claim 13 further including a plurality of forward facing seat units having staggered forward facing seats located in front of the forward facing seat of the transition seat unit.

15. The passenger seating arrangement according to claim 13 wherein the angled seats are angled away from the aisle.

16. The seat unit according to claim 1 wherein the each of the first console and second console includes a utility surface as an upper support surface.

17. A seat unit for a passenger seating arrangement provided within a vehicle cabin, the seat unit comprising:
    a first longitudinal side bordering an aisle of the vehicle cabin and a second longitudinal side;
    a forward facing seat arranged at the second longitudinal side and extending laterally towards the first longitudinal side;
    a first console arranged adjacent to the forward facing seat and extending laterally between the forward facing seat and the first longitudinal side; and
    a wall structure behind the forward facing seat and first console, the wall structure extending between the first longitudinal side and the second longitudinal side;
    wherein the seat unit is configured to link the forward facing seat and an angled seat;
    wherein the angled seat is arranged at the second longitudinal side and extends laterally towards the second longitudinal side behind the forward facing seat;
    wherein a second console is located adjacent to the angled seat behind the first console;
    the second console extending between the angled seat and the first longitudinal side; and
    wherein the first console provides a footwell for the passenger of the forward facing seat arranged behind the wall structure.

18. The seat unit according to claim 17 wherein the angled seat is angled toward the aisle.

19. The seat unit according to claim 17 further including a plurality of angled seat units having angled seats arranged one directly behind another in a longitudinal direction, the plurality of angled seat units being located behind the forward facing seat.

* * * * *